(12) United States Patent
Herberg et al.

(10) Patent No.: US 9,401,895 B2
(45) Date of Patent: Jul. 26, 2016

(54) DEVICE CONFIGURATION FOR SECURE COMMUNICATION

(71) Applicant: FUJITSU LIMITED, Kawasaki-shi, Kanagawa (JP)

(72) Inventors: Ulrich Herberg, Sunnyvale, CA (US); Daisuke Mashima, Sunnyvale, CA (US)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/266,418

(22) Filed: Apr. 30, 2014

(65) Prior Publication Data
US 2015/0319142 A1    Nov. 5, 2015

(51) Int. Cl.
| H04L 29/06 | (2006.01) |
| G06F 21/42 | (2013.01) |
| G06F 21/60 | (2013.01) |
| G06Q 50/06 | (2012.01) |
| H04L 9/08 | (2006.01) |
| H04L 9/32 | (2006.01) |

(52) U.S. Cl.
CPC ............ *H04L 63/0428* (2013.01); *G06F 21/42* (2013.01); *G06F 21/606* (2013.01); *H04L 63/061* (2013.01); *H04L 63/0823* (2013.01); *H04L 63/0838* (2013.01); *H04L 63/168* (2013.01); *H04L 63/18* (2013.01); *G06F 2221/2117* (2013.01); *G06Q 50/06* (2013.01); *H04L 9/0866* (2013.01); *H04L 9/3215* (2013.01); *H04L 9/3228* (2013.01)

(58) Field of Classification Search
USPC .................. 235/379; 705/7.23; 713/156, 171
See application file for complete search history.

(56) References Cited

U.S. PATENT DOCUMENTS

| 2013/0173915 A1 | 7/2013 | Haulund |
| 2013/0179681 A1 | 7/2013 | Benson et al. |
| 2013/0179692 A1 | 7/2013 | Tolba et al. |

FOREIGN PATENT DOCUMENTS

EP          2 216 716 A1     11/2010

OTHER PUBLICATIONS

Network Working Group Internet-Draft, C. Jennings, Transitive Trust Enrollment for Constrained Devices draft-jennings-core-transitive-trustenrollment-01, Oct. 13, 2012.
EP Office Action dated Sep. 21, 2015 in application No. 15152555.7.

*Primary Examiner* — Allyson Trail
(74) *Attorney, Agent, or Firm* — Maschoff Brennan

(57) ABSTRACT

A method including generating a mapping in response to an enrollment message received from a customer device. The enrollment message includes a device identification number (device ID) of the customer device. The mapping includes a one-time password (OTP) encrypted using the device ID. The method includes generating a quick response (QR) code including a uniform resource locator (URL), a provider certificate (CRT), and certificate signing request (CSR) content. The method includes receiving a confirmation message at a website identified by the URL. The confirmation message includes a generated public key, a CSR, and a decrypted OTP. The method includes verifying the decrypted OTP against the mapping and communicating one or more application configuration settings. The method includes securely communicating information using the one or more application configuration settings, a provider public key, a provider private key, the generated public key, and a generated private key.

22 Claims, 8 Drawing Sheets

US 9,401,895 B2

DEVICE CONFIGURATION FOR SECURE COMMUNICATION

FIELD

The embodiments discussed herein are related to secure communications.

BACKGROUND

Utilities incentivize curtailment of energy usage during certain high load periods to increase the ability of the utilities to meet a larger demand or to minimize production costs. For example, in summer months, peak energy usage may occur on hot days in the late afternoon. A utility may offer an incentive to a factory to reduce energy usage during the late afternoon. In response, the factory may delay a high load production run until later in the evening, turn down the air-conditioning in the factory, or otherwise reduce energy use. In this manner, the utility may increase its ability to meet energy demands during the peak energy usage and/or avoid producing or purchasing additional energy to meet the energy demands.

The curtailment in energy usage during peak or high load periods may be referred to generally as demand response (DR). The energy usage curtailment during a specified duration of time may be referred to as a DR event. DR events generally occur when a utility expects a high demand and asks customers to reduce or curtail energy usage. When a customer reduces its energy usage by an agreed-upon amount, the utility may provide an incentive to the customer.

In some DR systems, DR aggregators mediate communication between utilities and customers. The DR aggregators generally have an agreement with the utilities to coordinate with the customers and implement DR events.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a method may include generating a mapping in response to an enrollment message received from a customer device. The enrollment message may include a device identification number (device ID) of the customer device. The mapping may include a one-time password (OTP) encrypted using the device ID. The method may include generating a quick response (QR) code including a uniform resource locator (URL), a provider certificate (CRT), and certificate signing request (CSR) content. The method may include receiving a confirmation message at a website identified by the URL. The confirmation message may include a generated public key, a CSR, and a decrypted OTP. The method may include verifying the decrypted OTP against the mapping and communicating one or more application configuration settings. The method may include securely communicating information using the one or more application configuration settings, a provider public key, a provider private key, the generated public key, and a generated private key.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Some embodiments discussed herein are related to configuring a device for secure communication. In an example embodiment, a customer device such as a smart phone may be configured for secure communication with a demand response (DR) server. After the customer device is configured, the DR server may securely communicate information related to DR such as DR event details with the customer device. The customer device may be configured for secure communication with the DR server by running a software program, such as an application. Various acts may be performed to configure the application such that the application may securely communication with the DR server.

To configure the application on the customer device, a customer may communicate an enrollment message to the DR server via an out-of-band (OOB) network, such as a network through which the DR server does not normally communicate information about DR events. The enrollment message may include a device identification number (device ID) of the customer device. The DR server may generate a mapping and a QR code in response to receiving the enrollment message. The mapping may include a one-time password (OTP) encrypted using the device ID. The QR code may include, among other information, the encrypted OTP. The customer device may scan or otherwise read the QR code to extract the information therefrom. After the QR code is read, the customer device may generate a public key, a private key, and a certificate signing request (CSR), which may be communicated to the DR server in a confirmation message. The DR server may communicate the CSR to a certificate authority (CA). The CA may respond with a certificate (CRT) of the device. The DR server may then communicate the CRT and application configuration settings (settings) to the customer device, where the settings may be applied. Once applied the customer device may be configured for secure communication with the DR server. Some additional embodiments are described with reference to the appended figures.

Figure 1:
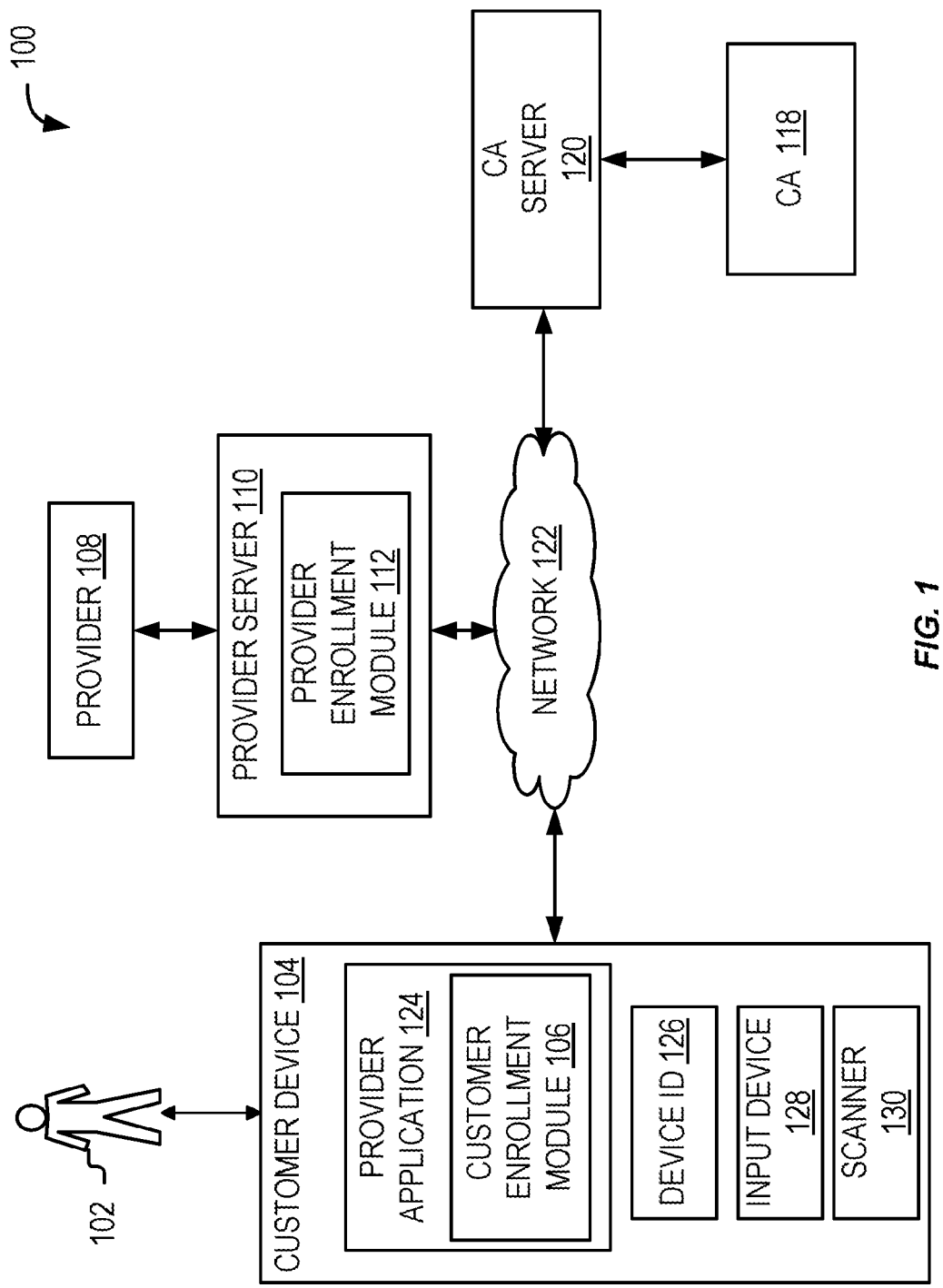
FIG. 1 illustrates an example operating environment in which some embodiments described herein may be implemented.

FIG. 1 illustrates an example operating environment 100 in which some embodiments described herein may be implemented. In the operating environment 100 of FIG. 1, a customer device 104 may be configured for communication with a provider server 110.

The operating environment 100 of FIG. 1 may include a customer 102 associated with the customer device 104, the customer device 104, a provider 108 associated with the provider server 110, the provider server 110, a CA server 120, and a CA 118 associated with the CA server 120. The customer device 104, the CA server 120, and the provider server 110 may be configured to communicate via the network 122. Additionally, in the operating environment 100 of FIG. 1, the customer device 104 may include a customer enrollment module 106 and the provider server 110 may include a provider enrollment module 112. The customer enrollment module 106 may be configured to communicate data and information with the provider enrollment module 112 via the network 122 to enable enrollment of the customer device 104 to the provider server 110 and/or bootstrapping of the customer device 104 for secure communication with the provider server 110.

The network 122 may be wired or wireless, and may have numerous different configurations including, but not limited to, a star configuration, token ring configuration, or other configurations. Furthermore, the network 122 may include a local area network (LAN), a wide area network (WAN) (e.g., the Internet), and/or other interconnected data paths across which multiple devices may communicate. In some embodiments, the network 122 may be a peer-to-peer network. The network 122 may also be coupled to or include portions of a telecommunications network that may enable communication of data in a variety of different communication protocols.

In some embodiments, the network 122 may include BLUETOOTH® communication networks and/or cellular communications networks for sending and receiving data including via short messaging service (SMS), extensible messaging and presence protocol (XMPP), multimedia messaging service (MMS), hypertext transfer protocol (HTTP), direct data connection, wireless application protocol (WAP), email, etc. In some embodiments, the network 122 may enable communication via a standard-based protocol such as smart energy profile (SEP), Echonet Lite, OpenADR, or another suitable protocol (e.g., wireless fidelity (Wi-Fi), ZigBee, HomePlug Green, etc.).

Additionally, in some embodiments, the operating environment 100 may include non-digital and/or non-electrical communication networks in addition to the network 122. For example, information may be generated at the provider server 110 and a paper copy (e.g., a letter) including the generated information may be communicated to the customer 102 via the mail. In the operating environment 100 of FIG. 1, one or more of the non-digital and/or non-electrical communication networks may be supported between the CA server 120, the provider server 110, and the customer device 104.

In some embodiments, one or more of the communication networks may be deemed an OOB network. Generally, the OOB network may include a network over which information is not normally communicated, which may include a non-digital and/or non-electrical network. For example, the customer device 104 may communicate information to the provider server 110 via the internet during normal operations. The customer 102 may also communicate information with the provider server 110 directly or indirectly using a telephonic communication network (e.g., speaking or entering data via an input device 128). In this example, the telephonic communication network may be deemed the OOB network.

The CA server 120 may include a hardware server that includes a processor, memory, and communication capabilities. In the illustrated embodiment, the CA server 120 may be coupled to the network 122 and configured to send and receive data to and from the customer device 104 and/or the CA server 120 via the network 122. The CA server 120 may be associated with the CA 118. The CA 118 may include an entity that issues digital certificates (e.g., the CRTs) that certify ownership of a public key (e.g., the provider public key and/or the customer device public key). By certifying ownership of the public key, entities may reliably encrypt communications using the public key knowing that ownership of the private key.

The CA server 120 may be configured to receive a CSR from an entity or a device associated therewith. The CA server 120 and/or the CA 118 may then verify ownership of a public key associated with the CSR. The CSR may be formatted according to the public-key cryptography standards (PKCS) #10, for instance. The CA 118 may issue a CRT in response to the CSR and communicate the CRT via the network 122. For example, the customer device 104 may communicate a CSR to the CA server 120. The CA 118 may issue a customer device CRT for the customer device public key and communicate the customer device CRT to the customer device 104 via the network 122. The customer device 104 may then communicate the customer device CRT with the customer device public key to the provider server 110. Additionally or alternatively, the customer device 104 may communicate a customer device CSR to the provider server 110. The provider server 110 may then communicate the customer device CSR to the CA server 120. The CA 118 may then issue the customer device CRT and communicate the customer device CRT to the provider server 110. The provider server 110 may communicate the customer device CRT to the customer device 104.

The provider server 110 may include a hardware server that includes a processor, memory, and communication capabilities. In the illustrated embodiment, the provider server 110 may be coupled to the network 122 to send and receive data to and from the customer device 104 and/or the CA server 120 via the network 122. The provider server 110 may be associated with the provider 108. For example, the provider 108 may regularly control operation of the provider server 110. Additionally or alternatively, the provider 108 may control data and information communicated to the customer device 104 and/or the CA server 120 from the provider server 110 via the network 122.

The customer device 104 may be a computing device that includes a processor, memory, and network communication capabilities. For example, the customer device 104 may include a laptop computer, a desktop computer, a smartphone, a tablet computer, a mobile telephone, a personal digital assistant ("PDA"), a mobile email device, a portable game player, a portable music player, a television with one or more processors embedded therein or coupled thereto, or other electronic device capable of accessing the network 122.

The customer device 104 may include the customer enrollment module 106 and/or a provider application 124. The customer enrollment module 106 and/or the provider application 124 or a portion thereof installed on the customer device 104 may be configured to enable interaction with the customer 102. For example, the customer enrollment module 106 and/or the provider application 124 may be configured to provide a user interface that allows the customer 102 to view information communicated from the provider server 110. Additionally, the customer enrollment module 106 and/or the provider application 124 may be configured to communicate information via the network 122.

In particular, the customer enrollment module 106 may interface and/or communicate information with the provider enrollment module 112 via the network 122. The information communicated between the customer enrollment module 106 and the provider enrollment module 112 and/or between the customer device 104 and the provider server 110 may establish an enrollment between the provider server 110 and the customer device 104.

Additionally or alternatively, the information communicated by the provider enrollment module 112 may include settings. The settings include information used to configure the customer device 104 and/or the provider application 124 stored thereon for communication of information with the provider server 110. The settings may include particular device settings, application settings, a logo of the provider 108, protocols used, keys, initialization configurations, clocks, user options, transport module, provider identifiers, one or more other URLs, and the like.

In particular, in the operating environment 100 the customer device 104 and the provider server 110 may be enrolled with respect to one another. The enrollment may include an exchange of public keys and CRTs between the customer device 104 and the provider server 110. Following the exchange of the public keys and the verification of the CRTs, communication between the customer device 104 and the provider server 110 via a network 122 may be secured.

For example, for enrollment, the customer device 104 may receive a provider CRT and a provider public key from the provider server 110. The provider server 110 may receive a customer device CRT and a customer device public key from the customer device 104. Before data is communicated from the customer device 104 to the provider server 110, the data may be encrypted using the provider public key. Ciphertext of the data may then be communicated to the provider server 110. At the provider server 110, the ciphertext of the data may be decrypted using a provider private key. Likewise, before data is communicated from the provider server 110 to the customer device 104, the data may be encrypted using the customer device public key. Ciphertext of the data may then be communicated to the customer device 104. At the customer device 104, the ciphertext of the data may be decrypted using a customer device private key. In some embodiments, the enrollment may include exchange of x.509 CRTs.

In some embodiments, the enrollment may include exchange of CRTs and/or keys through a series of communications. The series of communications may begin with an enrollment message communicated by the customer 102. The provider enrollment module 112 may be configured to receive the enrollment message from the customer device 104 via the network 122, from the customer 102 via an OOB network, or via the customer device 104 via an OOB network. The enrollment message may include a device ID 126 of the customer device 104. For example, the customer 102 may call a system hosted on the provider server 110 and provide the device ID 126 verbally, the customer 102 may call a system hosted on the provider server 110 and provide the device ID 126 using an input device 128 such as a keyboard, mouse, touchscreen, and the like, and the customer 102 may send the enrollment message to the provider enrollment module 112 via a cellular network including the device ID 126.

In some embodiments, the customer enrollment module 106 and/or the provider application 124 may be configured to display the device ID 126 of the customer device 104. For example, upon an initial use of the customer enrollment module 106 and/or the provider application 124, the customer enrollment module 106 may prompt the customer 102 to communicate the enrollment message and display the device ID 126 to the customer 102.

Generally, the device ID 126 may include a device-specific number of the customer device 104. An example of the device ID 126 may include the Unique Device ID (UDID) used in APPLE® products that is a 40-digit alphanumeric sequence.

In response to the enrollment message, the provider enrollment module 112 may generate a mapping. The mapping generally links or maps the customer device 104 to the set of information identifying the customer device 104 and/or the customer 102 from which the enrollment message is communicated. The mapping may include an OTP, a customer identifier, and a temporary identifier.

The customer identifier may identify the customer 102 to the provider enrollment module 112. The temporary identifier may include an identifier that is temporarily assigned to the customer 102 that may hide the customer identifier from potential adversaries. The OTP may include a random 256-bit number, for instance. Additionally, the OTP and/or the temporary identifier may be encrypted using the device ID 126. An example of the mapping may include {customer ID, tmp ID, OTP, device ID}, in which customer ID represents a customer identifier and tmp ID represents the temporary identifier.

Additionally, the provider enrollment module 112 may generate a quick response (QR) code. Generally, QR codes include a matrix barcode that is machine-readable. Although embodiments described herein reference use of a QR code, use of any suitable optical label (e.g., a barcode) or unique label are within the scope of this disclosure.

The QR code may include a uniform resource locator (URL), the temporary identifier, the provider CRT, the provider public key (which may be included in the provider CRT), the OTP, and CSR content. One or more of the URL, the temporary identifier, the provider CRT, the provider public key, the OTP, and the CSR content in the QR code may be encrypted using the device ID 126. The CSR content may include information uses in a CSR. For example, the CSR content may include a distinguished name (DN), an organization name, a geographical location, an email address, and the like.

The URL included in the QR code may be that of a website on which the customer device 104 and the provider server 110 may communicate. Specifically, the URL may include a website of the provider enrollment module 112. In some embodiments, the CSR content may be communicated via the network 122 or otherwise outside the QR code. Additionally or alternatively, the QR code may include an encryption cipher and/or additional parameters for key generation (e.g., Rivest-Shamir-Adlemen (RSA) based encryption cipher or elliptic curve digital signature algorithm (ECDSA) based encryption cipher). In some embodiments, the one or more of the URL, the provider CRT, and the provider public key may also be encrypted using the device ID 126.

The QR code may be communicated to the customer 102 and/or the customer device 104. The QR code may be communicated via an OOB network. For example, the QR code may be included in a MMS message communicated to the customer device 104. Additionally, the QR code may be mailed to the customer 102. Additionally still, the QR code may be included in an email message sent to the customer 102.

The customer device 104 and/or the customer 102 may receive the QR code via the OOB network or via the network 122. In some embodiments in which the QR code is received via the OOB network (e.g., the mail), the customer 102 may use a scanner 130 of the customer device 104 or another system to scan the QR code. The scanner 130 may include a two-dimensional imaging scanner, a camera included in the customer device 104, or any other suitable scanner. The customer device 104 may accordingly receive a read image of the QR code, which may enable the customer enrollment module 106 to extract the information included in the QR code.

In some embodiments in which the QR code is received via the network 122, the customer device may include a software program that may be implemented to read the QR code. For example, if the QR code is emailed to the customer device 104, the customer device may implement a reader program such as QR DROID™ to digitally read the QR code.

The customer enrollment module 106 may generate a customer device public key and a customer device private key pair (customer device key pair). In some embodiments, the customer enrollment module 106 may generate the customer device key pair during or in response to an initial use of the provider application 124 and/or the customer enrollment module 106.

Additionally, the customer enrollment module 106 may be configured to decrypt the OTP encrypted using the device ID 126. By basing decryption of the OTP on the device ID 126, the provider server 110 may increase the likelihood that it is enrolling the customer device 104 with the device ID 126 sent in the enrollment request and not another entity that intercepted the QR code. Additionally, the customer enrollment module 106 may be configured to generate a customer device CSR.

The customer enrollment module 106 may then communicate a confirmation message to the provider enrollment module 112 via the network 122. The confirmation message may use TLS encryption without client authentication in some embodiments. The confirmation message may include the decrypted OTP, the generated customer device public key, and the customer device CSR. In some embodiments, the confirmation message may include the decrypted OTP and the generated customer device public key.

The provider enrollment module 112 may receive the confirmation message at a website identified by the URL included in the QR code. The provider enrollment module 112 may then verify the decrypted OTP against the unencrypted OTP from the mapping. If the decrypted OTP is not verified, the provider enrollment module 112 may cease device enrollment process with the customer enrollment module 112 and/or communicate to the customer 102 message indicating a potential security issue.

In some embodiments, the OTP may be rate-limited. For example, the OTP may be rate-limited per internet protocol (IP) address (e.g., the IP address of the customer device 104) and/or may be rate-limited per temporary identifier. For example, the OTP may be rate-limited to five attempts per IP address. By rate-limiting the OTP, the provider server 110 may fend off or avoid brute-force attacks.

In embodiments in which the confirmation message includes the customer device CSR, the provider enrollment module 112 may be configured to communicate the customer device CSR to the CA server 120. The CA 118 may sign the customer device CSR and transmit a customer device CRT to the provider enrollment module 112. The provider enrollment module 112 may communicate the customer device CRT to the customer device 104.

In embodiments in which the confirmation message does not include the customer device CSR, the customer enrollment module 106 may be configured to communicate the customer device CSR to the CA server 120 and receive the customer device CRT. The customer enrollment module 106 may communicate the customer device CRT to the provider enrollment module 112.

The provider enrollment module 112 may be configured to communicate one or more settings to the customer enrollment module 106. The settings may configure the customer enrollment module 106 and/or the provider application 124. In some embodiments, the settings may be encrypted. For example, the settings may be encrypted on the application layer. The encryption may be according to the customer device key pair generated by the customer enrollment module 106.

The customer enrollment module 106 may receive the settings. In embodiments in which the settings are encrypted, the customer enrollment module 106 may decrypt the settings. The customer enrollment module 106 may then apply the settings to the provider application 124. After the settings are applied and the customer device key pair is verified and distributed, the customer device 104 and the provider server 110 may securely communicate information.

For example, the customer device 104 may receive encrypted information and/or an encrypted command. The customer device 104 may decrypt the information and/or the command. The customer device 104 may use one or more of the settings to interpret and organize the information and/or the command. The customer device 104 may then display some portion of the information to the customer 102 and/or act in accordance with the command. Likewise, the customer device 104 may generate some information and/or a notification. The information and/or the notification may be encrypted using the provider public key and communicated to the provider server 110. The settings may be used to format the information, the notification, and/or generate the information in a usable form. The provider server 110 may receive the information, decrypt the information, and use the information.

In the above embodiments, the enrollment is performed using the customer device key pair and the CSR being communicated to the CA server 120. In some embodiments, the verification may be performed at the CA server 120 to confirm that the customer device 104 possesses the customer device private key. For example, in these and other embodiments may implement a challenge/response system such as a challenge-response authentication mechanism (CRAM). Additionally or alternatively, the CRS may be signed by the customer device private key. The CA server 120 may verify the signature by using the customer device public key, which may be included as part of the CSR.

In some embodiments, the enrollment may be performed in response to the provider application 124 being run by the customer device 104. For example, the customer 102 may download or otherwise load the provider application 124 onto the customer device 104. When the customer 102 opens the provider application 124, the customer enrollment module 106 may be initiated. In some embodiments, one or more features of the provider application 124 may be operated without initiating the customer enrollment module 106. The customer 102 may have to opt in to operation of the customer enrollment module 106.

Additionally, in some embodiments, each time the provider application 124 is started, the customer enrollment module 106 may be configured to verify that the device ID 126 of the customer device 104 matches that included in the enrollment message and to which the OTP is encrypted. In response to the device ID 126 not matching at startup, the provider application 124 may not start. In response to the device ID 126 matching, the provider application 124 may start. By verifying that the device ID 126 matches the device ID included in the enrollment message, cloning of the provider application 124 and/or customer enrollment module 106 may be detected.

In the embodiment depicted in FIG. 1, the customer enrollment module 106 is depicted as a portion of the provider application 124. In some embodiments, the customer enrollment module 106 may be a separate application or may be included in another application, for instance. The customer enrollment module 106 may be downloaded separately or concurrently with the provider application 124.

Modifications, additions, or omissions may be made to the operating environment 100 without departing from the scope of the present disclosure. Specifically, embodiments depicted in FIG. 1 include one customer 102, one customer device 104, one provider server 110, one provider 108, one CA server 120, and one CA 118. However, the present disclosure applies to the operating environment 100 that may include one or more customers 102, one or more customer devices 104, one or more provider servers 110, one or more CA servers 120, one or more CAs 118, or any combination thereof.

Specifically, in some embodiments, the provider application 124, the customer enrollment module 106, the provider enrollment module 112, or some combination thereof may be generic and/or universal. For example, the provider application 124 and/or the customer enrollment module 106 may be installed on multiple types of customer devices 104 running various operating systems, without limitation. Additionally or alternatively, the provider application 124 may enable various types of communication between the provider server 110 and the customer device 104. Additionally, the provider enrollment module 112 may be configured for use with multiple types of the providers 108 and/or for various providers 108 all characterized as having a similar type.

Moreover, the separation of various components in the embodiments described herein is not meant to indicate that the separation occurs in all embodiments. It may be understood with the benefit of this disclosure that the described components may be integrated together in a single component or separated into multiple components.

The provider application 124, the customer enrollment module 106, the provider enrollment module 112, or some combination thereof may include code and routines for software program verification. In some embodiments, the provider application 124, the customer enrollment module 106, the provider enrollment module 112, or some combination thereof act in part as a thin-client application that may be stored on a computing device and in part as components that may be stored on the provider server 110, for instance. In some embodiments, the provider application 124, the customer enrollment module 106, the provider enrollment module 112, or some combination thereof may be implemented using hardware including a field-programmable gate array (FPGA) or an application-specific integrated circuit (ASIC). In some other instances, the provider application 124, the customer enrollment module 106, the provider enrollment module 112, or some combination thereof may be implemented using a combination of hardware and software.

In the operating environment 100, memory such as memory in the customer device 104, the provider server 110, and the CA server 120 may include a non-transitory memory that stores data for providing the functionality described herein. The memory may be included in storage that may be a dynamic random access memory (DRAM) device, a static random access memory (SRAM) device, flash memory, or some other memory devices. In some embodiments, the storage also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

Figure 2:
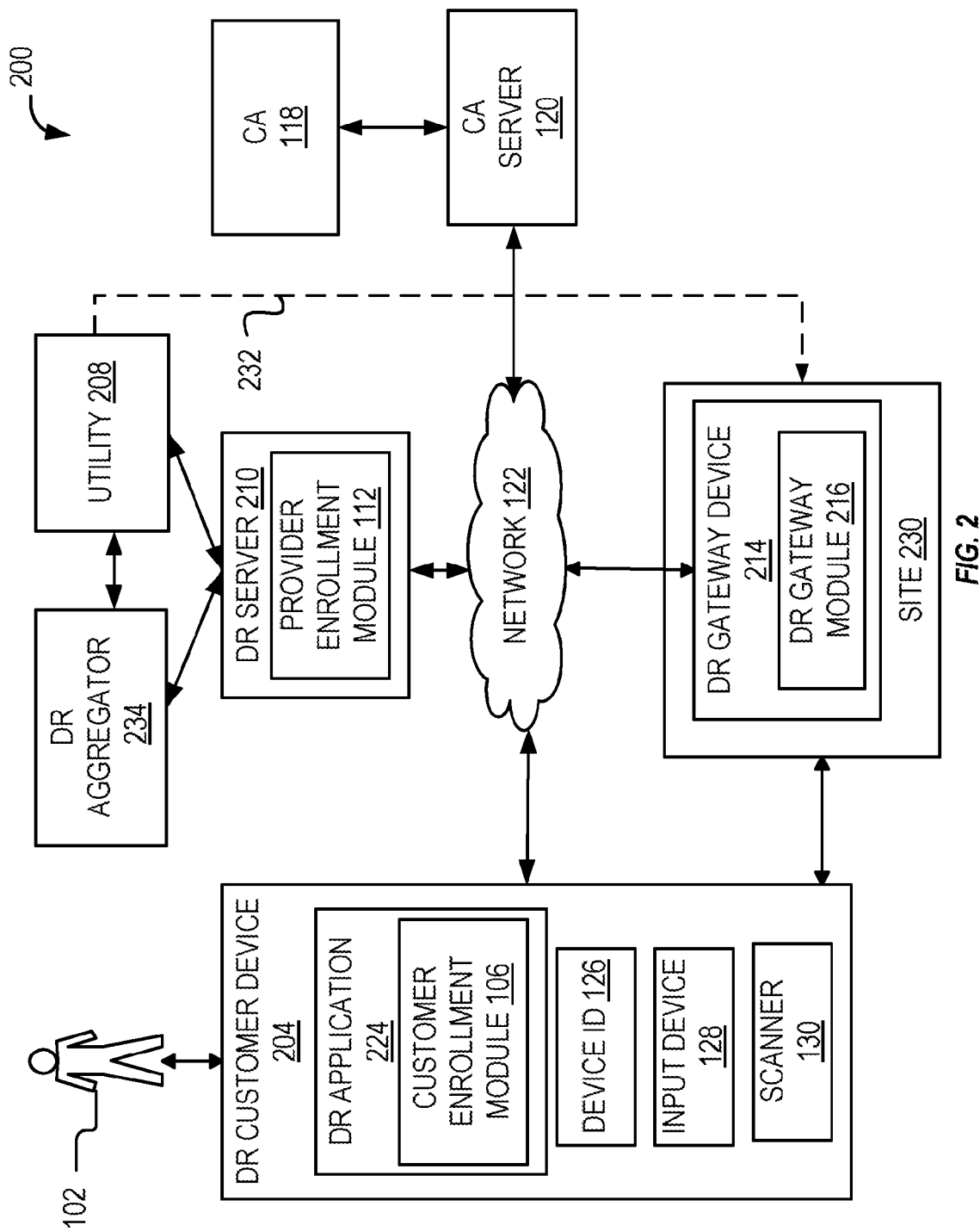
FIG. 2 illustrates an example electrical distribution system.

FIG. 2 illustrates an example electrical distribution system (distribution system) 200, arranged in accordance with at least one embodiment described herein. The distribution system 200 may include a particular embodiment of the operating environment 100 of FIG. 1. For example, with combined reference to FIGS. 1 and 2, a utility 208 and/or a DR aggregator 234 may be examples of the provider 108, a DR server 210 may be an example of the provider server 110, a DR customer device 204 may be an example of the customer device 104, and a DR application 224 may be an example of the provider application 124.

Referring to FIG. 2, the distribution system 200 may be configured to enable communication of information between the customer 102 and the utility 208 and/or the DR aggregator 234 regarding DR events. The DR events may include DR event periods during which a site 230 curtails energy usage. A DR event may be scheduled during periods of high demand, for example. By curtailing energy usage during periods of high demand, the utility 208 may meet the high demand without purchasing or otherwise generating or locating additional energy or may make available previously purchased energy for sale. In particular, the distribution system 200 may be configured to communicate information related to energy usage of the site 230 associated with the customer 102 and/or the DR customer device 204. For example, the information may include DR event duration, energy curtailment amounts, start times, particular customer appliances involved in the DR event, incentives for compliance with the DR event, and the like.

The distribution system 200 may be implemented to engage residential customers and/or small and medium-sized business (SMB) customers in DR events. Generally, engagement of residential/SMB customers may pose some difficulty. For example, the energy curtailment of each residential/SMB customer is relatively limited. Accordingly, limited resources may be invested in coordinating engagement of the residential/SMB customers. Additionally, the residential/SMB customers may have limited sophistication. Accordingly, residential/SMB customers may be deterred from participating in DR events if such participation involves complex installation of equipment. Some embodiments described herein may reduce the complexities associated with installation of equipment used for, among other things, engagement of residential/SMB customers and participation of DR events. In embodiments in which the distribution system 200 is implemented to engage residential/SMB customers, the customer 102 may include a residential/SMB customer. An example of a residential customer is an owner or an individual responsible, at least partially, for a residence such as a house, condominium, townhome, apartment, and the like. An example of a SMB customer may include an owner, an operator, or a manager of a SMB.

The distribution system 200 may include the utility 208, the DR aggregator 234, the site 230, the CA server 120, the CA 118, the network 122, and a DR gateway device (DR gateway) 214. The utility 208 may include any entity that supplies a resource to the site 230. The distribution system 200 is described herein with particularity in which the utility 208 supplies electricity to the site 230. In some embodiments, the distribution system 200 may provide another resource to the site 230 such as water, natural gas, etc. The utility 208 may be publicly owned or privately owned. Some examples of the utility 208 may include, but are not limited to, a power company and an energy cooperative.

In addition to supplying electricity to the site 230, the utility 208 may identify a DR event and set one or more terms for the DR event. The terms of the DR event may include an incentive, a DR event duration, a start and/or stop time for the DR event, and overall resource curtailment, for instance. The utility 208 may be associated with the DR server 210. As used herein the term "associated with," when used to describe the relationship between the utility 208 and the DR server 210, may indicate that the utility 208 may control or manage the DR server 210.

In FIG. 2, the supply of the electricity to the site 230 is represented by a dashed arrow 232. Supply of the electricity to the site 230 may be via a transmission section (not shown) including substations, distribution wiring, piping, pumps, tanks, or any other component on which or through which electricity may be transferred between the utility 208 and the site 230.

In some embodiments, the distribution system 200 may include the DR aggregator 234. Generally, the DR aggregator 234 may act as an intermediary between the utility 208 and the site 230 to coordinate implementation of DR events. In particular, the DR aggregator 234 may coordinate DR events such that a cumulative energy usage curtailment of multiple customers (e.g., customer 102) is sufficient to meet an overall energy usage curtailment of a DR event. In some embodiments, an incentive offered by the utility 208 may be received by the DR aggregator 234. The DR aggregator 234 may in turn offer some portion of the incentive to the customer 102 in exchange for participation by the site 230 in the DR event. Although not shown in FIG. 2, the DR aggregator 234 may communicate via the network 122. In embodiments including the DR aggregator 234, the DR server 210 may be associated with the DR aggregator 234. Additionally, in these and other embodiments, the DR application 224 may be configured to interact with the DR aggregator 234.

The site 230 may include buildings, residences, structures, equipment, or other objects that consume the electricity supplied by the utility 208. In particular, in embodiments in which the distribution system 200 is implemented to engage residential/SMB customers, the site 230 may include private residences or SMB. The site 230 may be associated with the customer 102 and/or the DR customer device 204. As used herein the term "associated with," when used to describe the relationship between the customer 102 and the site 230, may indicate that the customer 102 may control or manage the site 230. For instance, the customer 102 may include a residential customer of the utility 208 and the site 230 may include a residence of the customer 102. As another example, the customer 102 may include a SMB customer of the utility 208 and the site 230 may include a place of business or a piece of equipment of the customer 102.

In some embodiments, the site 230 may include the DR gateway 214. In particular, in some embodiments, the DR gateway 214 may include a separate device from the DR customer device 204. In other embodiments, the DR gateway device 214 may be omitted. Accordingly, the DR gateway 214 or some functionalities attributed thereto may be included in or performed by the DR customer device 204. For example, the DR customer device 204 may be implemented as described in U.S. patent application Ser. No. 14/161,402 filed Jan. 22, 2014, which is incorporated herein by reference in its entirety.

Thus, in some embodiments, the distribution system 200 may include the DR customer device 204, the DR gateway 214, and the DR server 210. In these embodiments, the DR customer device 204 may be implemented to assist in enrolling the DR gateway 214 to the DR sever 210. In some other embodiments, the distribution system 200 may omit the DR gateway 214. In these embodiments, the DR customer device 204 may be enrolled in the DR server 210. In some further embodiments, the distribution system 200 may include the DR customer device 204, the DR gateway 214, and the DR server 210. The DR customer device 204 may be implemented to assist in enrolling the DR gateway 214 to the DR server 210 and may be enrolled in the DR server 210. An example of these further embodiments may include a site 230 having multiple appliances, some subset of which may be controlled by the DR gateway 214.

The DR gateway 214 may include a processor, memory, and network communication capabilities. The DR gateway 214 may be configured to automate or control electricity usage of the site 230 and/or one or more appliances included therein. Specifically, the DR gateway 214 may include a DR gateway module 216 configured to receive control messages from the DR customer device 204 and/or the DR server 210 to affect an operating condition of an appliance included in the site 230. The control messages may be responsive to a DR event issued by the utility 208 in some embodiments. Additionally or alternatively, the DR gateway 214 may affect an operating condition of an appliance in response to a temporal condition, an ambient condition, and the like. For example, the DR gateway 214 may be installed in a residence of the customer 102. The DR gateway 214 may be configured to control a thermostat that controls operation of a heater. Upon reception of a control message from the customer device 104 or the DR server 210, the DR gateway 214 may cease operation of the heater. Although not explicitly shown in FIG. 1, the operating environment 100 may include a device similar to the DR gateway 214. In the operating environment 100, the device may include a router, a proxy server, or another node that may convert protocols or otherwise perform one or more functions discussed with reference to the DR gateway 214.

The customer 102 may include any entity that contracts or otherwise agrees to receive the electricity supplied by the utility 208. The customer 102 may include an individual, a group of individuals, a business, an organization, or some combination thereof. In some embodiments, the customer 102 includes a residential customer or SMB customer that is a customer of the utility 208. The customer 102 may have agreed to participate in DR events issued by the utility 208 and/or the DR aggregator 234 or may have indicated that it may participate in some DR events issued by the utility 208 and/or the DR aggregator 234.

The DR server 210 may include a hardware server that includes a processor, memory, and communication capabilities. In the illustrated embodiment, the DR server 210 may be coupled to the network 122 to send and receive data to and from the customer device 104, the CA server 120, and the DR gateway 214 via the network 122. The DR server 210 may be associated with the utility 208.

The DR customer device 204 may be substantially similar to the DR customer device 204 of FIG. 1. For example, the DR customer device 204 may be a computing device that includes a processor, memory, and network communication capabilities such as a laptop computer, a desktop computer, a tablet computer, a smartphone, etc.

The DR customer device 204 may include the DR application 224. The DR application 224 may be configured to facilitate implementation of DR events issued by the utility 208. Additionally, in some embodiments, the DR application 224 may include a capability to control one or more appliances involved in the DR event. In these and other embodiments, the DR application 224 may additionally enable control of the one or more appliances without the DR gateway 214.

The DR application 224 may include the customer enrollment module 106. The customer enrollment module 106 and the provider enrollment module 112 may be configured to enroll the DR customer device 204 to the DR server 210 and/or configure the DR application 224 and/or configure the DR customer device 204 for use with the DR application 224. In some embodiments, the customer enrollment module 106 of the DR application 224 may be configured to establish the enrollment and/or configure the DR application 224 and/or the DR customer device 204 as described with reference to FIG. 1 and elsewhere herein.

In some embodiments, the customer enrollment module 106, the provider enrollment module 112, and the DR gateway module 216 may be configured to operate together. Specifically, the DR gateway 214 may be configured to communicate with the DR server 210 rather than the DR server 210 communicating with the DR customer device 204. Accordingly, in these and other embodiments, the DR gateway 214 may be enrolled with the DR server 210 using the customer enrollment module 106, the provider enrollment module 112, and the DR gateway module 216.

For example, in some embodiments, the provider enrollment module 112 may be configured to receive an enrollment message from the customer device 104 via an OOB network as described above. The enrollment message may include a device identification number (device ID) 126 of the DR customer device 204.

In response to the enrollment message, the provider enrollment module 112 may generate a mapping. The mapping may generally link or map the DR customer device 204 to a set of information identifying the DR customer device 104 and/or the customer 102 from which the enrollment message is communicated. The mapping may include the OTP, a customer identifier, and a temporary identifier. The OTP may be encrypted using the device ID 126. The provider enrollment module 112 may generate a QR code including a URL, a utility (or DR aggregator) CRT, a utility (or DR aggregator) public key, which may be included in the utility CRT, the OTP encrypted using the device ID 126, and gateway device CSR content. The URL included in the QR code may include a website of the provider enrollment module 112.

The QR code may then be communicated to the customer 102 and/or the DR customer device 204 via an OOB network. The customer 102 may use the scanner 130 of the DR customer device 204 or another system (e.g., a software application or the like) to read the QR code. The DR customer device 204 may accordingly receive a read image of the QR code, which may enable the customer enrollment module 106 to extract the information included in the QR code.

The DR gateway module 216 may generate a gateway device public key and gateway device public key pair (gateway key pair). In some embodiments, the DR gateway module 216 may generate the gateway key pair upon an initial use of the DR application 224 and/or the customer enrollment module 106.

The customer enrollment module 106 may be configured to query the DR gateway 214. In response, the DR gateway 214 may communicate the gateway device public key and a gateway device CSR to the customer enrollment module 106.

Additionally, the customer enrollment module 106 may be configured to decrypt the OTP encrypted using the device ID 126. By basing decryption of the OTP on the device ID 126, the DR server 210 may increase the likelihood that it is enrolling the DR customer device 204 and not another entity that intercepted the QR code.

The customer enrollment module 106 may communicate a confirmation message to the provider enrollment module 112 via the network 122. The confirmation message may use transport layer security (TLS) encryption without client authentication in some embodiments. The confirmation message may include the decrypted OTP, the generated gateway device public key, and the gateway device CSR. In some embodiments, the confirmation message may include the decrypted OTP and the generated gateway device public key.

The provider enrollment module 112 may receive the confirmation message at a website identified by the URL included in the QR code. The provider enrollment module 112 may then verify the decrypted OTP against the unencrypted OTP from the mapping. In some embodiments, the OTP may be rate-limited.

In embodiments in which the confirmation message includes the gateway device CSR, the provider enrollment module 112 may be configured to communicate the gateway device CSR to the CA server 120. The CA 118 may sign the gateway device CSR and transmit a gateway device CRT to the provider enrollment module 112. The provider enrollment module 112 then communicates the gateway device CRT to the customer device 104.

In embodiments in which the confirmation message does not include the gateway device CSR, the customer enrollment module 106 may be configured to communicate the gateway device CSR to the CA server 120 and receive the gateway device CRT. The customer enrollment module 106 may then communicate the gateway device CRT to the provider enrollment module 112.

The provider enrollment module 112 may be configured to communicate one or more settings to the customer enrollment module 106. The settings may configure the customer enrollment module 106, the DR application 224, the DR gateway 214, or some combination thereof for communications of information with the DR sever 110 during operation. In some embodiments, the settings may be encrypted. For example, the settings may be encrypted on the application layer. The encryption may be according to the gateway device key pair.

The customer enrollment module 106 may receive the settings. In embodiments in which the settings are encrypted, the customer enrollment module 106 may decrypt the settings. The customer enrollment module 106 may then apply the settings in the DR gateway 214. After the settings are applied and the gateway key pair is verified and distributed, the DR server 210 and the DR gateway 214 may securely communicate information related to DR.

For example, the DR gateway 214 may receive encrypted information and/or an encrypted command. The DR gateway 214 may decrypt the information and/or the command. The DR gateway 214 may use one or more of the setting to interpret and organize the information and/or the command. The DR gateway 214 may then act in accordance with the command or use the information. Likewise, the DR gateway 214 may generate some information and/or a notification. The information and/or the notification may be encrypted using the provider public key and communicated to the DR server 210. The settings may be used to format the information, the notification, and/or generate the information in a usable form. The DR server 210 may receive the information, decrypt the information, and use the information.

In the embodiment depicted in FIG. 2, the customer enrollment module 106 is depicted as a portion of the DR application 224. In some embodiments, the customer enrollment module 106 may be a separate application or may be included in another application, for instance. The customer enrollment module 106 may be downloaded separately or concurrently with the DR application 224.

Modifications, additions, or omissions may be made to the distribution system 200 without departing from the scope of the present disclosure. Specifically, embodiments depicted in FIG. 2 include one customer 102, one DR customer device 204, one DR server 210, one utility 208, one DR aggregator 234, one CA server 120, one site 230, one DR gateway 214, and one CA 118. However, the present disclosure applies to the distribution system 200 that may include one or more DR customer devices 204, one or more DR servers 210, one or more DR aggregators 234, one or more utilities 208, one or more sites 230, one or more DR gateways 214, one or more customers 102, one or more CA servers 120, one or more CAs 118, or any combination thereof.

Specifically, in some embodiments, the DR application 224, the DR gateway module 216, the customer enrollment module 106, the provider enrollment module 112, or some combination thereof may be generic and/or universal. For example, the DR application 224 and/or the customer enrollment module 106 may be installed on multiple types of DR customer devices 204 running various operating systems, without limitation. Additionally, the DR gateway module 216 may be configured for use with multiple types of DR gateways 214. Additionally, the provider enrollment module 112 may be configured for use with multiple utilities 208 and/or multiple DR aggregators 234.

Moreover, the separation of various components in the embodiments described herein is not meant to indicate that the separation occurs in all embodiments. It may be understood with the benefit of this disclosure that the described components may be integrated together in a single component or separated into multiple components.

The DR application 224 and/or the DR gateway module 216 may include code and routines for secure communication. In some embodiments, the DR application 224 and/or the DR gateway module 216 may act in part as a thin-client application that may be stored on a computing device and in part as components that may be stored on the DR server 210, for instance. In some embodiments, the DR application 224 and/or the DR gateway module 216 may be implemented using hardware including a field-programmable gate array (FPGA) or an application-specific integrated circuit (ASIC). In some other instances, the DR application 224 and/or the DR gateway module 216 may be implemented using a combination of hardware and software.

In the distribution system 200, memory such as memory in the DR customer device 204, the DR server 210, and the DR gateway 214 may include a non-transitory memory that stores data for providing the functionality described herein. The memory may be included in storage that may be a dynamic random access memory (DRAM) device, a static random access memory (SRAM) device, flash memory, or some other memory devices. In some embodiments, the storage also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

Figure 3:
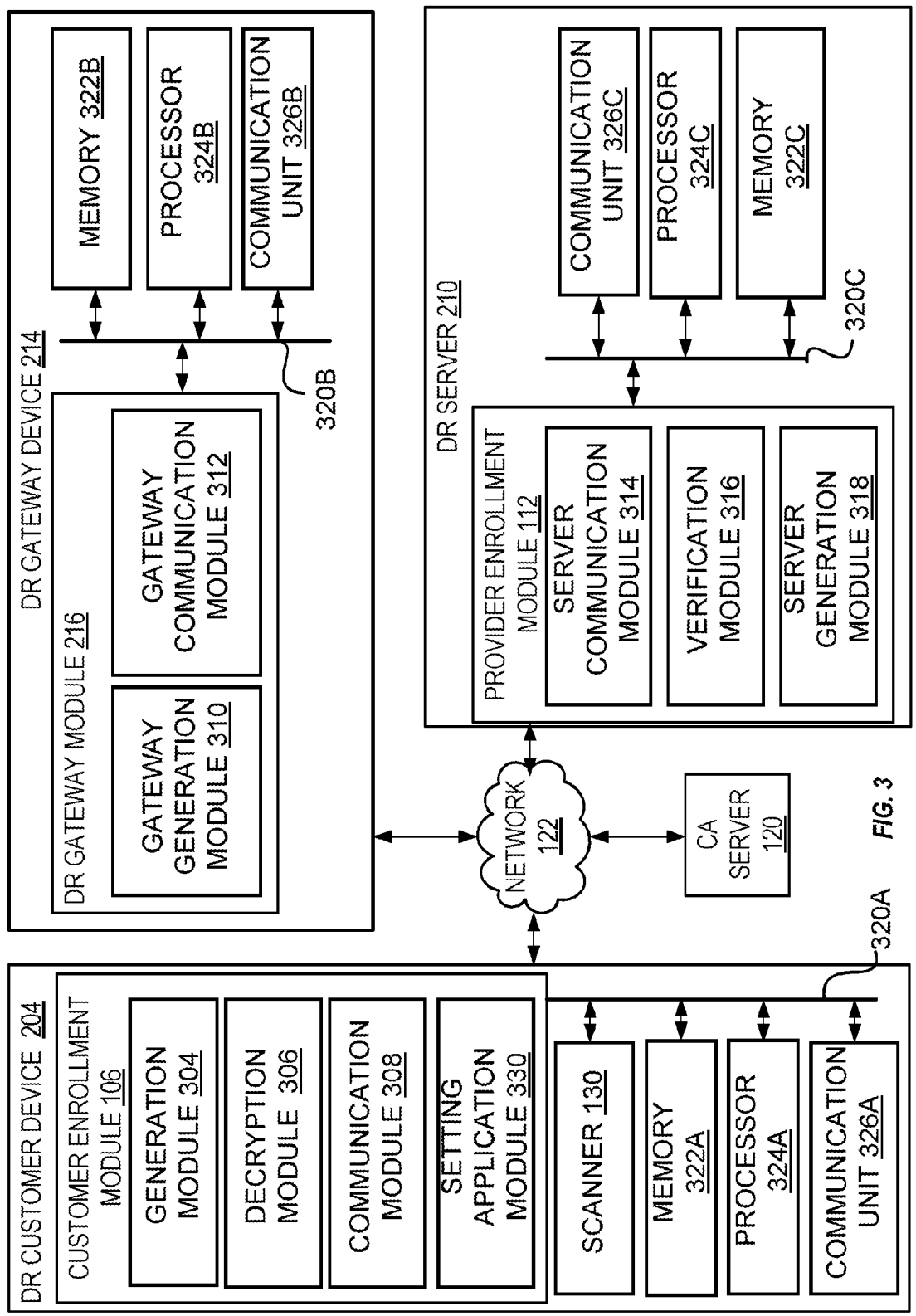
FIG. 3 illustrates an example demand response (DR) customer device, an example DR gateway device, and an example DR server that may be implemented in the distribution system of FIG. 2.

Referring now to FIG. 3, examples of the customer enrollment module 106, the DR gateway module 216, and the provider enrollment module 112 are shown in more detail. FIG. 3 is a block diagram of an example of the DR customer device 204, an example of the DR gateway 214, and an example of the DR server 210.

The DR customer device 204 may include the customer enrollment module 106, the scanner 130, a processor 324A, a memory 322A, and a communication unit 326A. The customer enrollment module 106, the scanner 130, the processor 324A, the memory 322A, and the communication unit 326A may be coupled via a bus 320A.

The DR gateway 214 may include the DR gateway module 216, a processor 324B, a memory 322B, and a communication unit 326B. The DR gateway module 216, the processor 324B, the memory 322B, and the communication unit 326B may be coupled via a bus 320B.

The DR server 210 may include the provider enrollment module 112, a processor 324C, a memory 322C, and a communication unit 326C. The provider enrollment module 112, the processor 324C, the memory 322C, and the communication unit 326C may be coupled via a bus 320C.

The processors 324A-324C are referred to generally herein as the processor 324 or the processors 324, the memories 322A-322C are referred to generally herein as the memory 322, the communication units 326A-326C are referred to generally herein as the communication unit 326 or the communication units 326, and the buses 320A-320C are referred to generally herein as the bus 320 or the buses 320.

With combined reference to FIGS. 2 and 3, the processors 324 may include an arithmetic logic unit (ALU), a microprocessor, a general-purpose controller, or some other processor array to perform computations and DR event assessment. The processors 324 may be coupled to the buses 320 for communication with the other components (e.g., 106, 216, 112, 326, and 322). The processors 324 generally process data signals and may include various computing architectures including a complex instruction set computer (CISC) architecture, a reduced instruction set computer (RISC) architecture, or an architecture implementing a combination of instruction sets. In FIG. 3, the DR customer device 204, the DR gateway 214, and the DR server 210 each include a single processor 324. However, the DR customer device 204, the DR gateway 214, and the DR server 210 may each include multiple processors. Other processors, operating systems, and physical configurations may also be possible.

The memory 322 may be configured to store instructions and/or data that may be executed by one or more of the processors 324. The memory 322 may be coupled to the buses 320 for communication with the other components. The instructions and/or data may include code for performing the techniques or methods described herein. The memory 322 may be a DRAM device, an SRAM device, flash memory, or some other memory device. In some embodiments, the memory 322 also includes a non-volatile memory or similar permanent storage device and media including a hard disk drive, a floppy disk drive, a DVD-RAM device, a DVD-RW device, a flash memory device, or some other mass storage device for storing information on a more permanent basis.

The communication unit 326 may be configured to transmit and receive data to and from at least one of the DR server 210, the DR gateway 214, and the DR customer device 204. The communication unit 326 may be coupled to the buses 320. In some embodiments, the communication unit 326 includes a port for direct physical connection to the network 140 or to another communication channel. For example, the communication unit 326 may include a USB, SD, CAT-5, or similar port for wired communication with the components of the distribution system 200. In some embodiments, the communication unit 326 includes a wireless transceiver for exchanging data via communication channels using one or more wireless communication methods, including IEEE 802.11, IEEE 802.16, BLUETOOTH®, or another suitable wireless communication method.

In some embodiments, the communication unit 326 includes a cellular communications transceiver for sending and receiving data over a cellular communications network including via SMS, MMS, HTTP, XMPP, direct data connection, WAP, email, or another suitable type of electronic communication. In some embodiments, the communication unit 326 includes a wired port and a wireless transceiver. The communication unit 326 may also provide other conventional connections to the network 122 for distribution of files and/or media objects using standard network protocols including transmission control protocol/internet protocol (TCP/IP), HTTP, HTTP secure (HTTPS), and simple mail transfer protocol (SMTP), etc.

In the embodiment of FIG. 3, the customer enrollment module 106 may include a generation module 304 ("generation module" in FIG. 3), a setting application module 330, a decryption module 306, and a customer communication module 308 (in FIG. 3 "communication module 308").

The DR gateway module 216 may include a gateway generation module 310 and a gateway communication module 312. The provider enrollment module 112 may include a server communication module 314, a verification module 316, and a server generation module 318.

One or more of the customer enrollment modules 106, the generation module 304, the setting application module 330, the decryption module 306, the customer communication module 308, the DR gateway module 216, the gateway generation module 310, the gateway communication module 312, the provider enrollment module 112, the server communication module 314, the verification module 316, and the server generation module 318 (collectively, bootstrapping modules) may be implemented as software including one or more routines configured to perform one or more operations. The bootstrapping modules may include a set of instructions executable by the processors 324 to provide the functionality described below. In some instances, the bootstrapping modules may be stored in or at least temporarily loaded into the memory 322 and may be accessible and executable by one or more of the processors 324. One or more of the bootstrapping modules may be adapted for cooperation and communication with one or more of the processors 324 via one or more of the buses 320.

The customer communication module 308, the gateway communication module 312, and the server communication module 314 (collectively, communication modules 308/312/314) may be configured to handle communications between the customer enrollment module 106, the DR gateway module 216, the provider enrollment module 112, the memory 222, the processors 324, and the communication units 326. The communication modules 308/312/314 may be configured to send and receive data, via the communication units 326, to and from one or more of the CA servers 120, the DR server 210, the DR gateway 214, the DR customer device 204, and other components of the distribution system 200. In some instances, the communication modules 308/312/314 may cooperate with one or more of the other certificate modules (e.g., 304, 306, 310, 316, 318, and 330) to receive and/or forward, via the communication units 326, data from the components of the distribution system 200.

For example, in some embodiments, the customer communication module 308 may be configured to communicate an enrollment message. The enrollment message may be communicated via the network 122 or an OOB network included therein. The enrollment message may include a device ID of the DR customer device 204. The server communication module 314 may be configured to receive the enrollment message. The server communication module 314 may communicate a signal to the server generation module 318 indicating that the enrollment message is received.

In response, the server generation module 318 may be configured to generate a mapping including an OTP encrypted using the device ID and a QR code that includes the encrypted OTP, a URL, a server CRT, CSR content, or some combination thereof. In some embodiments, the URL, the server CRT, the CSR content, or some combination thereof may also be encrypted using the device ID. The server communication module 314 may communicate the QR code. In some embodiments, the QR code may be communicated via the network 122. In other embodiments, the QR code may be communicated via an OOB network (e.g., mail).

The customer communication module 308 may be configured to receive the QR code. For example, in embodiments in which the QR code is communicated via the network 122, the customer communication module 308 may receive the QR code. In embodiments in which the QR code is communicated via an OOB network, the customer communication module 308 may not receive the QR code.

The customer communication module 308 may be configured to receive a read image of the QR code. For example, the scanner 130 may be used to scan the QR code. The scanner 130 may then communicate a scanned image of the QR code to the customer communication module 308. Additionally or alternatively, a software application may digitally read the QR code and communicate the read image of the QR code to the customer generation module 304. The read image of the QR code may be communicated to the decryption module 306 and the customer generation module 304. Additionally or alternatively, a software application may digitally read the QR code and communicate the read image of the QR code to the customer generation module 304.

The decryption module 306 may be configured to decrypt an OTP included in the QR code. The decryption module 306 may communicate a decrypted OTP to the customer communication module 308.

The generation module 304 may be configured to generate a customer device key pair and/or a customer device CSR. A customer device public key of the customer device key pair and the customer device CSR may be communicated to the customer communication module 308. The customer communication module 308 may communicate the generated customer device public key, the decrypted OTP, and the customer device CSR to the URL included in the QR code as a confirmation message.

The server communication module 314 may receive the confirmation message. The server communication module 314 may communicate the confirmation message or some portion thereof to the verification module 316 and to the CA server 120. The verification module 316 may be configured to verify the decrypted OTP against the unencrypted OTP from the mapping.

The CA server 120 may issue a customer device CRT and/or a signed customer device CSR to the server communication module 314. The server communication module 314 may then communicate the customer device CRT and settings to the customer communication module 308.

The customer communication module 308 may receive the settings and a customer device CRT. In some embodiments, the settings and the customer device CRT may be encrypted. In these and other embodiments, the settings and the customer device CRT may be decrypted by the decryption module 306. The settings and the customer device CRT may be communicated to the setting application module 330.

The setting application module 330 may be configured to apply the settings and/or save the customer device CRT such that the DR customer device 204 is configured for secure communication with the DR server 210.

Additionally, in some embodiments, the customer communication module 308 may be configured to query the DR gateway 214. Specifically, the customer communication module 308 may communicate a query to the gateway communication module 312 via the buses 320A and 320B and the network 122. The gateway communication module 312 may receive the query and communicate a signal indicative of the query to the gateway generation module 310.

The gateway generation module 310 may be configured to generate a gateway key pair and a gateway device CSR. The gateway communication module 312 may then communicate the gateway device CSR and a gateway device public key of the gateway key pair to the customer communication module 308. The customer communication module 308 may forward the gateway device public key and the gateway device CSR to the URL included in the QR code.

The server communication module 314 may receive the gateway device CSR and communicate the gateway device CSR to the CA server 120. The CA server 120 may communicate a gateway CRT to the server communication module 314, which may communicate the gateway CRT and settings to the customer communication module 308.

The customer communication module 308 may receive the settings and a gateway device CRT and forward the settings and the gateway device CRT to the gateway generation module 310. The settings may be applied at the DR gateway 214 and the gateway device CRT may be saved at the DR gateway 214. The DR gateway 214 may then be configured to securely communicate with the DR server 210.

Additionally or alternatively, in some embodiments, the customer communication module 308 may be configured to communicate the gateway CSR and/or the device CSR to the CA server 120. Additionally, the customer communication module 308 may receive CRTs (e.g., the customer device CRT and/or the gateway device CRT) from the CA server 120.

Figure 4:
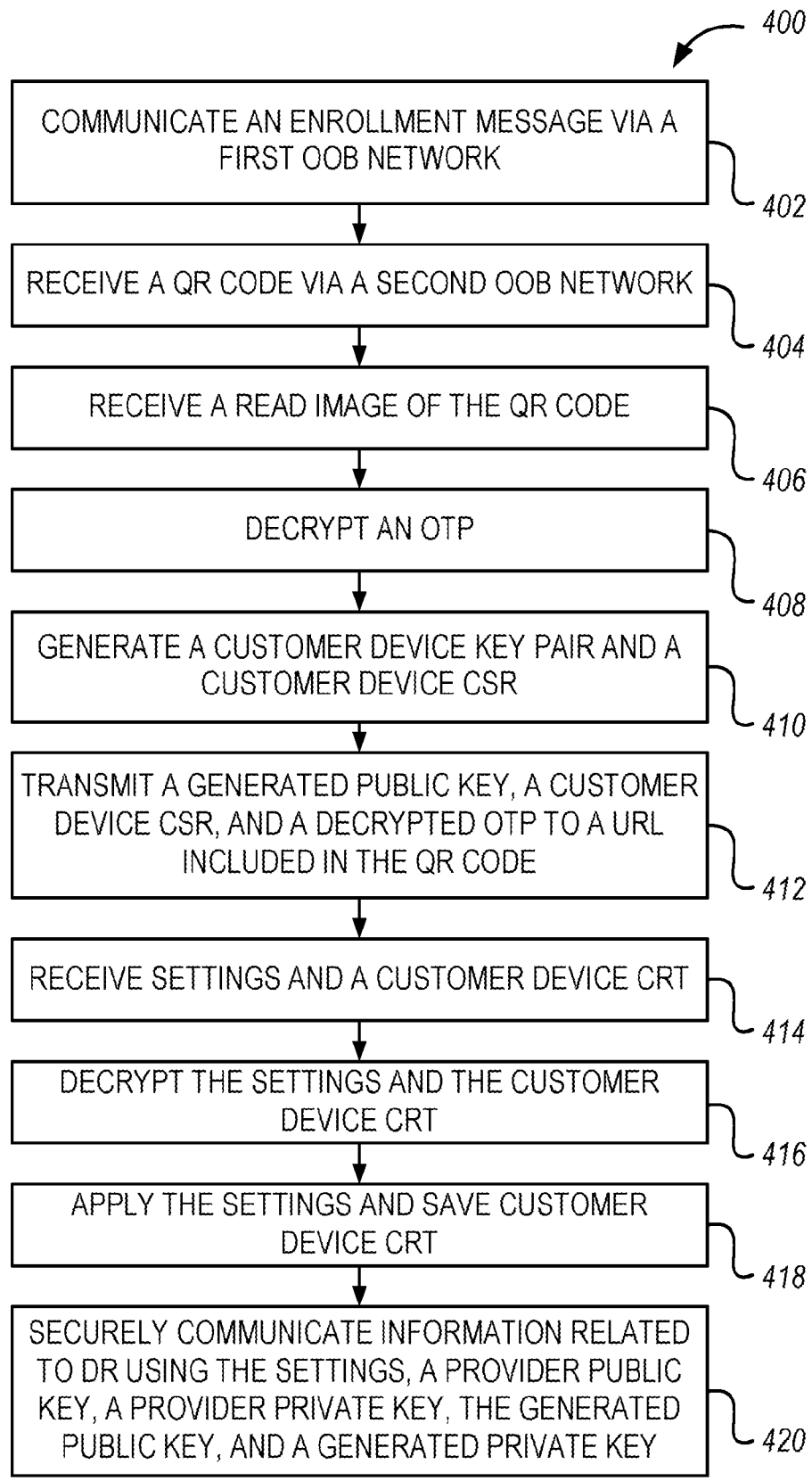
FIG. 4 is a flow diagram of an example method of configuring a customer device for communication with a provider server.

FIG. 4 is a flow diagram of an example method 400 of configuring a customer device for communication with a provider server, arranged in accordance with at least one embodiment described herein. The method 400 may be performed in an operating system such as the operating environment 100 of FIG. 1 as well as in other operating environments such as the distribution system 200 of FIG. 2. The method 400 may be programmably performed in some embodiments by the customer device 104 described with reference to FIG. 1 and/or the DR customer device 204 described with reference to FIGS. 2 and 3. The customer device 104 may include or may be communicatively coupled to a non-transitory computer-readable medium (e.g., the memory 322A of FIG. 3) having stored thereon or encoded therein programming code or instructions that are executable by a processor to perform or cause performance of the method 400. Additionally or alternatively, the customer device 104 may include a processor (e.g., the processor 324A of FIG. 3) that is configured to execute computer instructions to cause or control performance of the method 400. Although illustrated as discrete blocks, various blocks may be divided into additional blocks, combined into fewer blocks, or eliminated, depending on the desired implementation.

At block 402, an enrollment message may be communicated. The enrollment message may be communicated via a first OOB network such as a telephonic network, an email network, mail, and an MMS network. The enrollment message may include a device ID of a device (e.g., the customer device 104 of FIG. 1 and/or the DR customer device 204 of FIGS. 2 and 3).

At block 404, a QR code may be received. The QR code may include OTP encrypted using the device ID, a URL, a utility CRT, and customer device CSR content. The QR code may be received via a second OOB network, such as a telephonic network, an email network, mail, and an MMS network. In this and other embodiments, the first OOB network is different from the second OOB network. In other embodiments, the enrollment message and the QR code may be communicated via the same OOB network.

At block 406, a read image of the QR code may be received. For example, a scanner may scan or read the QR code. Additionally or alternatively, software may be implemented to otherwise read the QR code. At block 408, the OTP may be decrypted using the device ID. In some embodiments, the QR code may include the QR code may include one or more of a URL, a temporary identifier of a customer, a utility CRT, a utility public key (which may be included in the utility CRT), the OTP, and CSR content. One or more of the URL, the temporary identifier, the utility CRT, the utility public key, the OTP, and the CSR content may be encrypted using the device ID 126. Accordingly, any of the URL, the temporary identifier, the utility CRT, the utility public key, the OTP, and the CSR content may be decrypted using the device ID.

At block 410, a customer device key pair and a customer device CSR may be generated. The customer device key pair may include a customer device public key and a customer device private key. Additionally, in some embodiments, the customer device CSR may be signed by using the generated private key.

At block 412, the generated customer device public key, the customer device CSR, and a decrypted OTP may be transmitted to the URL included in the QR code. At block 414, settings and a customer device CRT may be received. In this and other embodiments, the settings and the customer device CRT may be encrypted. In some embodiments, the settings and the customer device CRT may not be encrypted.

At block 416, the settings and the customer device CRT may be decrypted. At block 418, the settings may be applied and the customer device CRT may be saved. For example, the customer device CRT may be saved to a customer device such as the customer device 104 of FIG. 1 and/or the DR customer device 204 of FIGS. 2 and 3 such that the customer device CRT may be included with encrypted communications. Additionally or alternatively, the settings may be installed or applied in the customer device 104 of FIG. 1 and/or the DR customer device 204 for operation with the DR application 224. At block 420, information may be securely communicated using the settings, a provider public key, a provider private key, the generated customer device public key, and a generated customer device private key. In some embodiments, the information may be related to DR. In these embodiments, the information may be communicated using the settings, a utility public key, a utility private key, the generated customer device public key, and a generated customer device private key.

One skilled in the art will appreciate that, for this and other procedures and methods disclosed herein, the functions performed in the processes and methods may be implemented in differing order. Furthermore, the outlined acts and operations are only provided as examples, and some of the acts and operations may be optional, combined into fewer acts and operations, or expanded into additional acts and operations without detracting from the disclosed embodiments. For example, the method 400 may include communicating the customer device CSR to a CA and receiving a signed customer device CSR and/or the customer device CRT from the CA. As another example, the method 400 may not include the block 416.

Figure 5:
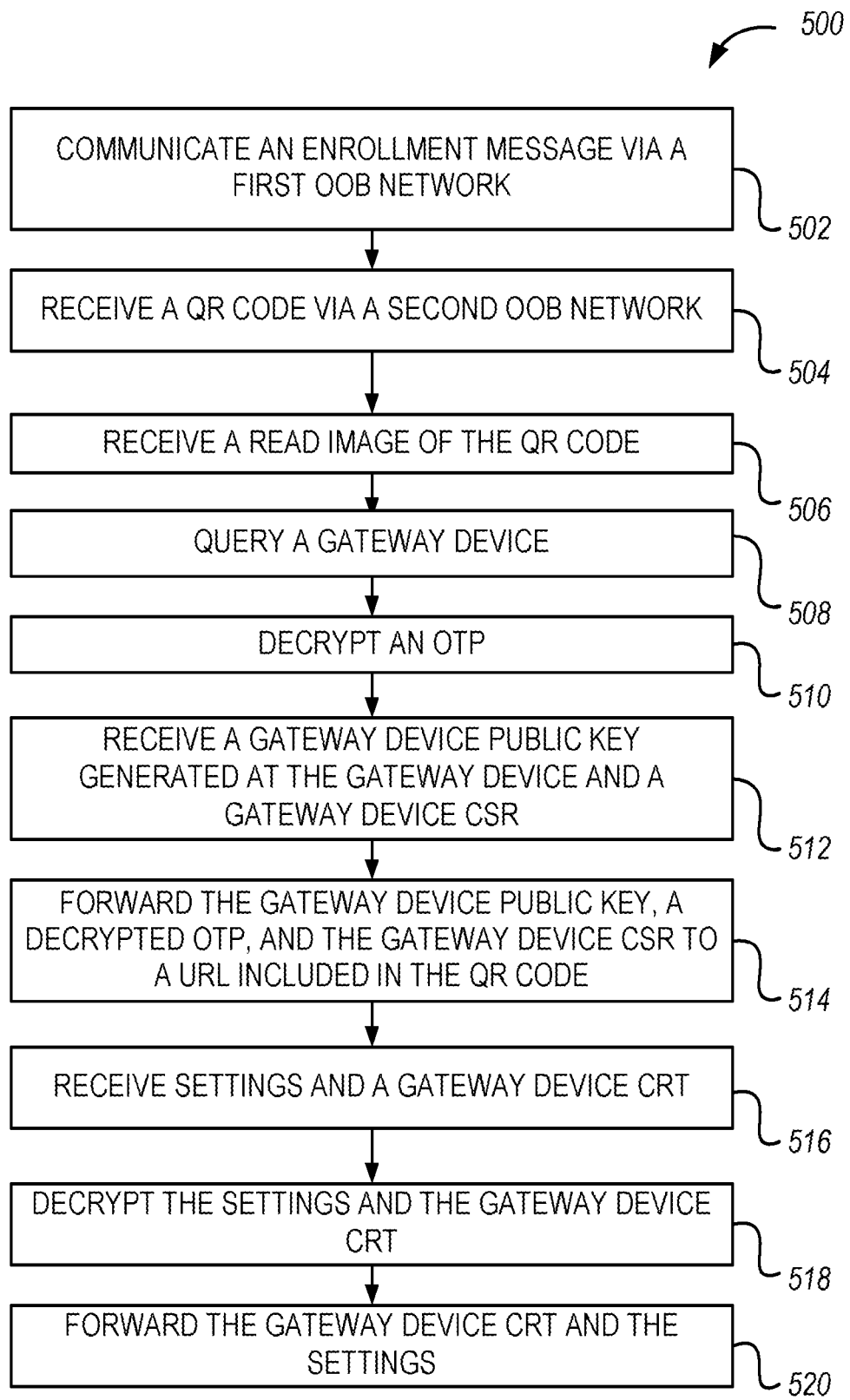
FIG. 5 is a flow diagram of an example method of configuring a gateway device for communication with a provider server.

FIG. 5 is a flow diagram of an example method 500 of configuring a gateway device for communication with a DR server, arranged in accordance with at least one embodiment described herein. The method 500 is described with reference to communication of information related to DR events with a gateway device. The method 500 may be performed in any environment in which a gateway device or a similar device is configured for communication with a server.

The method 500 may be performed in a distribution system such as the distribution system 200 of FIG. 2 as well as in other operating environments such as the operating environment 100 of FIG. 1. The method 500 may be programmably performed in some embodiments by the DR customer device 204 described with reference to FIGS. 2 and 3. The DR customer device 204 may include or may be communicatively coupled to a non-transitory computer-readable medium (e.g., the memory 322A of FIG. 3) having stored thereon or encoded therein programming code or instructions that are executable by a processor to perform or cause performance of the method 400. Additionally or alternatively, the DR customer device 204 may include a processor (e.g., the processor 324A of FIG. 3) that is configured to execute computer instructions to cause or control performance of the method 500. Although illustrated as discrete blocks, various blocks may be divided into additional blocks, combined into fewer blocks, or eliminated, depending on the desired implementation.

At block 502, an enrollment message may be communicated. The enrollment message may be communicated via a first OOB network such as a telephonic network, an email network, mail, and an MMS network. The enrollment message may include a device ID of a device (e.g., the DR customer device 204 of FIGS. 2 and 3).

At block 504, a QR code may be received. The QR code may include OTP encrypted using the device ID, a URL, a utility CRT, and customer device CSR content. The QR code may be received via a second OOB network, such as a telephonic network, an email network, mail, and an MMS network. In this and other embodiments, the first OOB network is different from the second OOB network. In other embodiments, the enrollment message and the QR code may be communicated via the same OOB network.

At block 506, a read image of the QR code may be received. For example, a scanner may scan or read the QR code and/or software may be implemented to read the QR code. At block 508, a gateway device may be queried. The gateway device may include the DR gateway 214 of FIGS. 2 and 3. At block 510, the OTP may be decrypted using the device ID. At block 512, a gateway device public key generated at the gateway device and a gateway device CSR may be received. Additionally, in some embodiments, the gateway device CSR may be signed by using the generated gateway device private key.

At block 514, the gateway device public key, a decrypted OTP, and the gateway device CSR may be forwarded to a URL included in the QR code. At 516, settings and a gateway device CRT may be received. In this and other embodiments, the settings and the gateway device CRT may be encrypted. In some embodiments, the settings and the customer device CRT may not be encrypted. At block 518, the settings and the gateway device CRT may be decrypted. At block 520, the decrypted settings and the gateway device CRT may be forwarded. For example, the decrypted settings and the gateway device CRT may be forwarded to the gateway device. The gateway device may then apply the settings during communications and/or the gateway device may save and/or communicate the gateway device CRT. In some embodiments, the method 500 may include fewer or additional acts. For example, the method 500 may not include the block 518.

Figure 6:
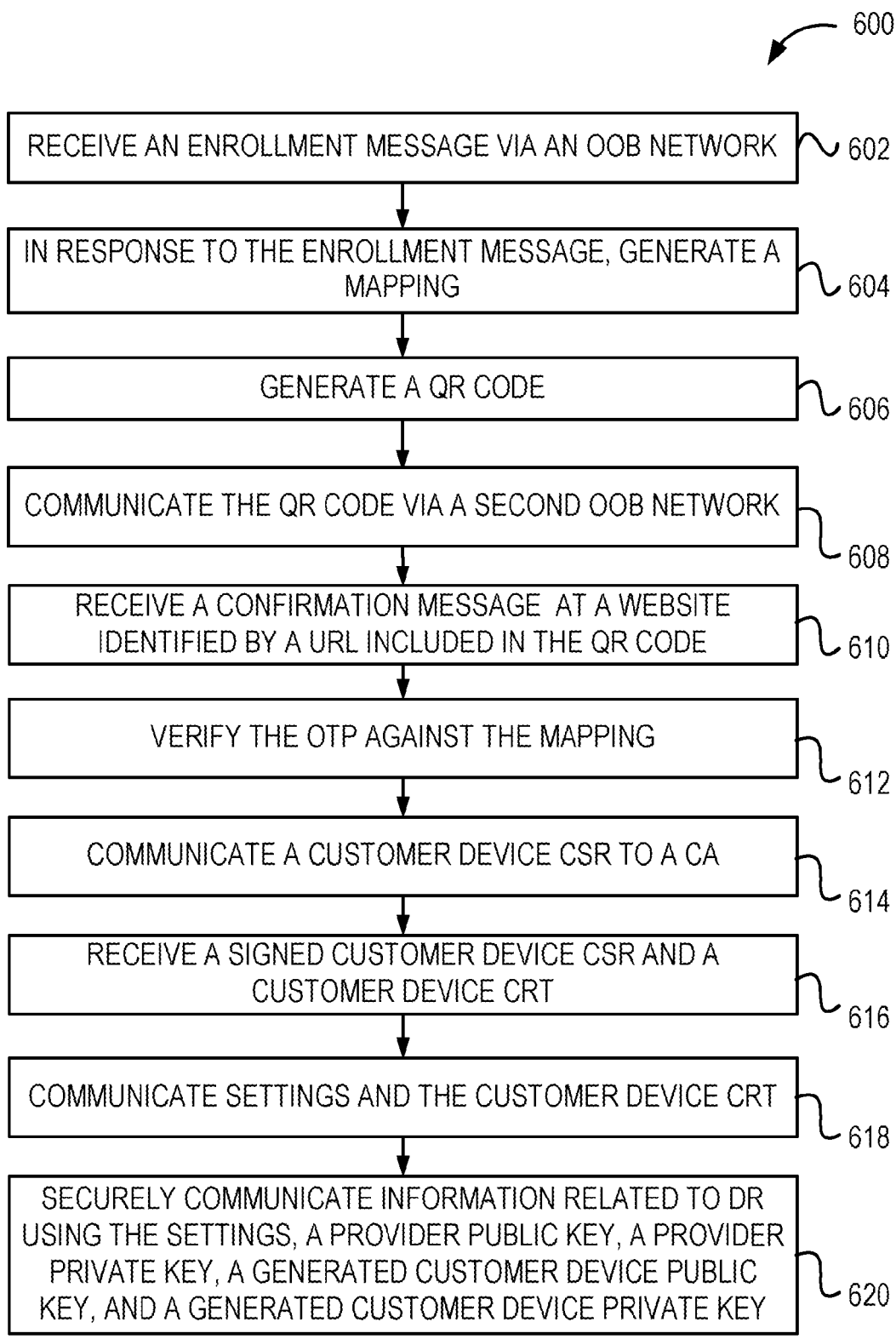
FIG. 6 is a flow diagram of another example method of configuring a customer device for communication with a provider server.

FIG. 6 is a flow diagram of an example method 600 of configuring a customer device for communication with a provider server, arranged in accordance with at least one embodiment described herein. The method 600 may be performed in an operating system such as the operating environment 100 of FIG. 1 as well as in other operating environments such as the distribution system 200 of FIG. 2. The method 600 may be programmably performed in some embodiments by the provider server 110 described with reference to FIG. 1 and/or the DR server 210 described with reference to FIGS. 2 and 3. The provider server 110 and/or DR server 210 may include or may be communicatively coupled to a non-transitory computer-readable medium (e.g., the memory 322C of FIG. 3) having stored thereon or encoded therein programming code or instructions that are executable by a processor to perform or cause performance of the method 600. Additionally or alternatively, the provider server 110 and/or DR server 210 may include may include a processor (e.g., the processor 324C of FIG. 3) that is configured to execute computer instructions to cause or control performance of the method 600. Although illustrated as discrete blocks, various blocks may be divided into additional blocks, combined into fewer blocks, or eliminated, depending on the desired implementation.

At block 602, an enrollment message may be received. The enrollment message may be received via a first OOB network such as a telephonic network, an email network, mail, and an MMS network. The enrollment message may include a device ID of a device (e.g., the customer device 104 of FIG. 1 and/or the DR customer device 204 of FIGS. 2 and 3). At block 604, in response to the enrollment message, a mapping may be generated. The mapping may include an OTP encrypted using the device ID.

At block 606, a QR code may be generated. The QR code may include a URL, the OTP encrypted using the device ID, a provider CRT, and customer device CSR content. At block 608, the QR code may be communicated via a second OOB network. For example, the second OOB network may be communicated via a telephonic network, an email network, mail, or an MMS network. In this and other embodiments, the first OOB network is different from the second OOB network. In other embodiments, the enrollment message and the QR code may be communicated via the same OOB network.

At block 610, a confirmation message may be received at a website identified by the URL included in the QR code. The confirmation message may include a generated device public key, a customer device CSR, and a decrypted OTP. The confirmation message may be communicated according to a TLS cryptographic protocol.

At block 612, the decrypted OTP may be verified against the mapping. At block 614, the customer device CSR may be communicated to a CA. At block 616, a signed customer device CSR and/or a customer device CRT may be received.

For example, the signed customer device CSR and the customer device CRT may be received from the CA.

At block 618, settings and the customer device CRT may be communicated. For example, the settings and the customer device CRT may be communicated to a DR customer device such as the DR customer device 204 of FIGS. 2 and 3. At block 620, information may be securely communicated using the settings, a provider public key, a provider private key, the generated customer device public key, and a generated customer device private key. In some embodiments, the information may be related to DR. In these and other embodiments, the information may be securely communicated using the settings, a utility public key, a utility private key, the generated customer device public key, and a generated customer device private key.

Figure 7:
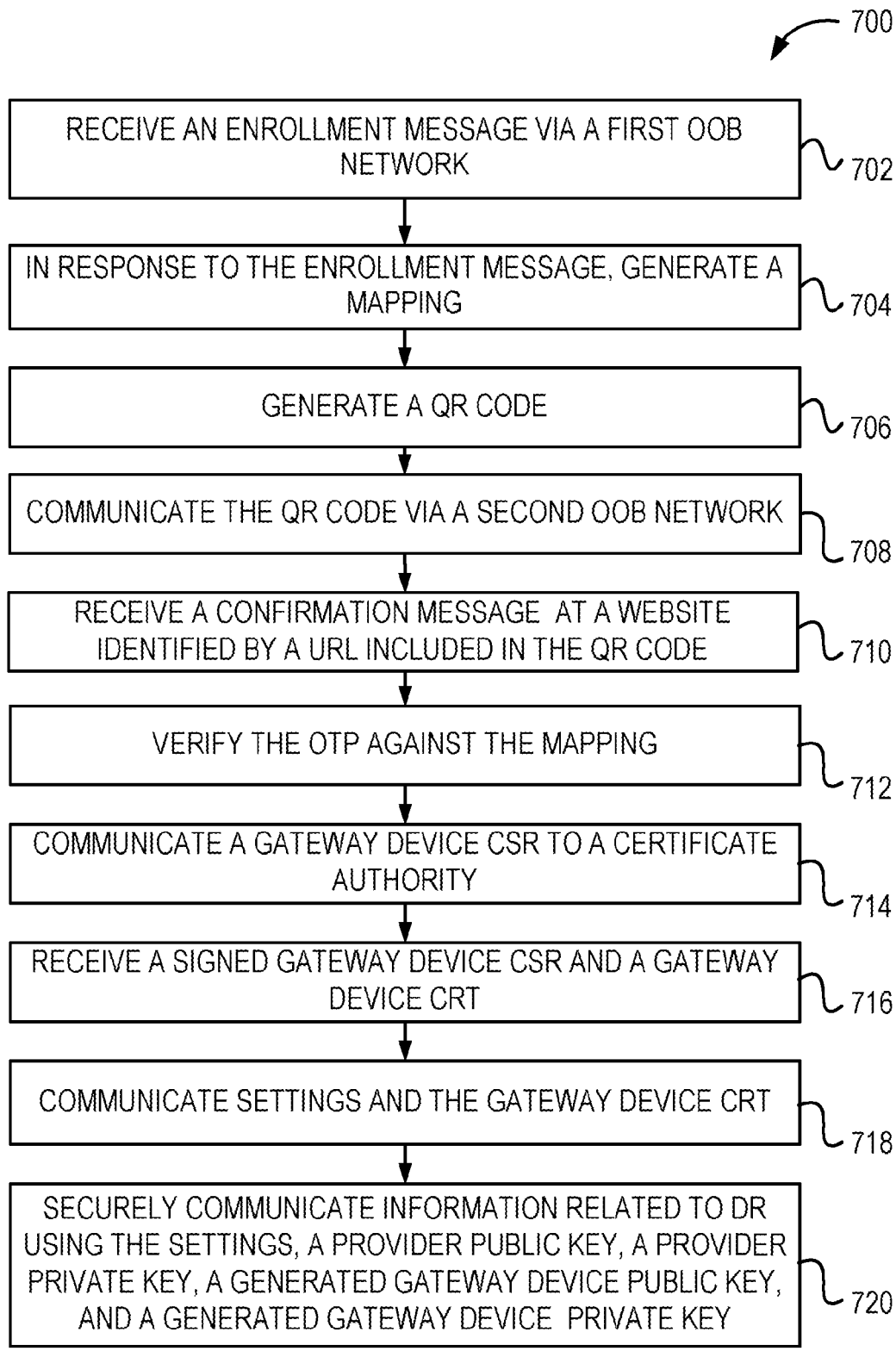
FIG. 7 is a flow diagram of another example method of configuring a gateway device for communication with a provider server.

FIG. 7 is a flow diagram of an example method 700 of configuring a gateway device for communication with a provider server, arranged in accordance with at least one embodiment described herein. The method 700 may be performed in an operating system such as the operating environment 100 of FIG. 1 as well as in other operating environments such as the distribution system 200 of FIG. 2. The method 700 may be programmably performed in some embodiments by the provider server 110 described with reference to FIG. 1 and/or the DR server 210 described with reference to FIGS. 2 and 3. The provider server 110 and/or DR server 210 may include or may be communicatively coupled to a non-transitory computer-readable medium (e.g., the memory 322C of FIG. 3) having stored thereon or encoded therein programming code or instructions that are executable by a processor to perform or cause performance of the method 700. Additionally or alternatively, the provider server 110 and/or DR server 210 may include may include a processor (e.g., the processor 324C of FIG. 3) that is configured to execute computer instructions to cause or control performance of the method 700. Although illustrated as discrete blocks, various blocks may be divided into additional blocks, combined into fewer blocks, or eliminated, depending on the desired implementation.

At block 702, an enrollment message may be received. The enrollment message may be received via a first OOB network such as a telephonic network, an email network, mail, and an MMS network. The enrollment message may include a device ID of a device (e.g., the customer device 104 of FIG. 1 and/or the DR customer device 204 of FIGS. 2 and 3). At block 704, in response to the enrollment message, a mapping may be generated. The mapping may include an OTP encrypted using the device ID.

At block 706, a QR code may be generated. The QR code may include a URL, a provider CRT, the OTP encrypted using the device ID, and gateway device CSR content. At block 708, the QR code may be communicated via a second OOB network. For example, the second OOB network may be communicated via a telephonic network, an email network, mail, or an MMS network. In this and other embodiments, the first OOB network is different from the second OOB network. In other embodiments, the enrollment message and the QR code may be communicated via the same OOB network.

At block 710, a confirmation message may be received at a website identified by the URL included in the QR code. The confirmation message may include a generated gateway device public key, a gateway device CSR, and a decrypted OTP. The confirmation message may be communicated according to a TLS cryptographic protocol.

At block 712, the decrypted OTP may be verified against the mapping. At block 714, the gateway device CSR may be communicated to a CA. At block 716, a signed gateway device CSR and/or a gateway device CRT may be received. For example, the signed gateway device CSR and the gateway device CRT may be received from the CA.

At block 718, settings and the gateway device CRT may be communicated. For example, the settings and the gateway device CRT may be communicated to a DR customer device such as the DR customer device 204 of FIGS. 2 and 3. At block 720, information related to DR may be securely communicated with the gateway device using a provider public key, a provider private key, the generated gateway device public key, and a generated gateway device private key. In some embodiments, the information may be related to DR. In these and other embodiments, the information related to DR may be securely communicated with the gateway device using a utility public key, a utility private key, the generated gateway device public key, and a generated gateway device private key.

Figure 8:
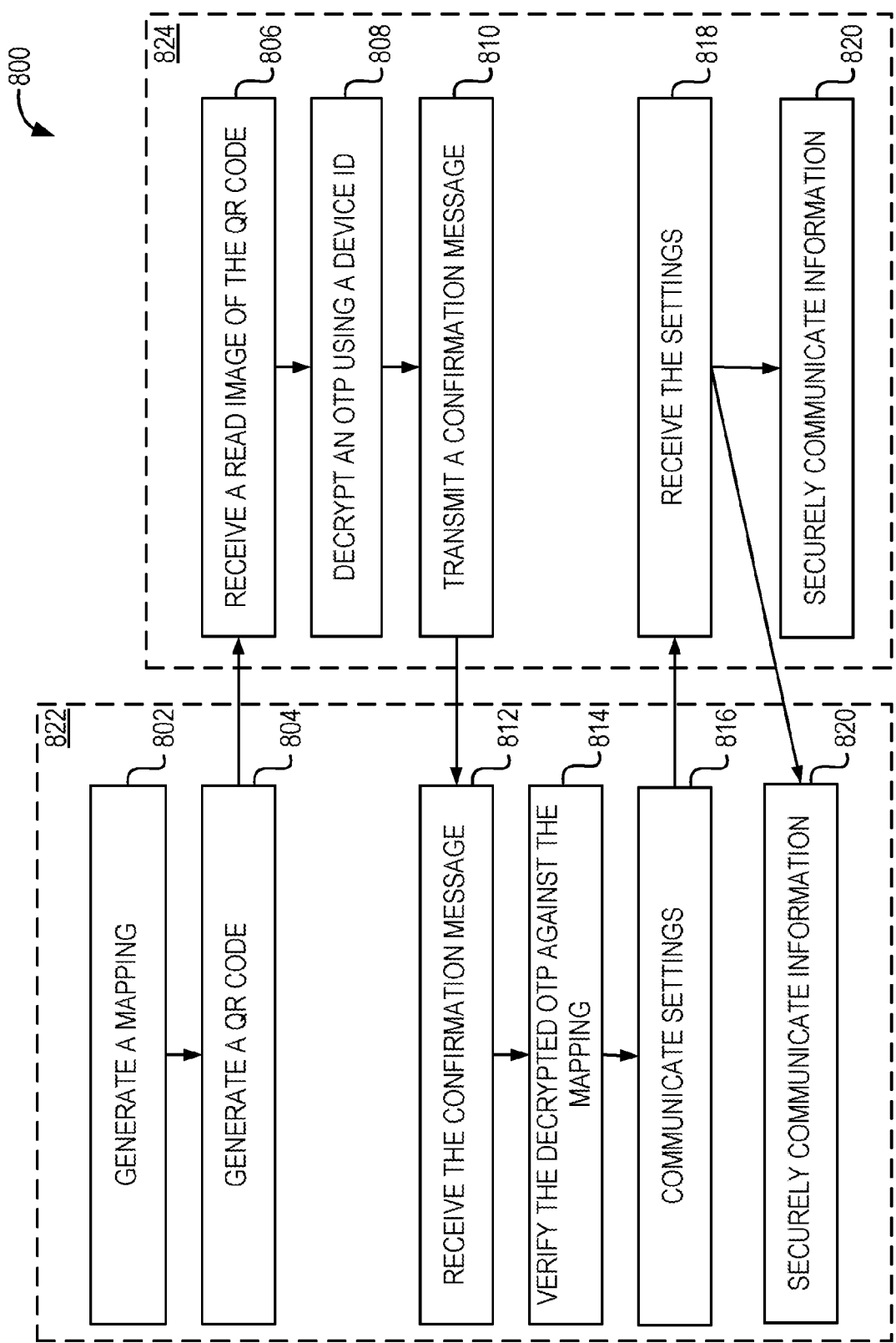
FIG. 8 is a flow diagram of another example method of configuring a gateway device or a customer device for communication with a provider server.

FIG. 8 is a flow diagram of an example method 800 of configuring a customer device and/or a gateway device for communication with a provider server, arranged in accordance with at least one embodiment described herein. The method 800 may be performed in an operating system such as the operating environment 100 of FIG. 1 as well as in other operating environments such as the distribution system 200 of FIG. 2. The method 800 may be programmably performed in some embodiments by the provider server 110 and the customer device 104 described with reference to FIG. 1 and/or the DR server 210 and the DR customer device 204 described with reference to FIGS. 2 and 3. The provider server 110, DR server 210, the customer device 104, the DR customer device 204, or any combination thereof may include or may be communicatively coupled to a non-transitory computer-readable medium (e.g., the memory 322C of FIG. 3) having stored thereon or encoded therein programming code or instructions that are executable by a processor to perform or cause performance of the method 800. Additionally or alternatively, the provider server 110, DR server 210, the customer device 104, the DR customer device 204, or any combination thereof may include may include a processor (e.g., the processor 324C of FIG. 3) that is configured to execute computer instructions to cause or control performance of the method 800. Although illustrated as discrete blocks, various blocks may be divided into additional blocks, combined into fewer blocks, or eliminated, depending on the desired implementation.

The blocks included in the method 800 are depicted in FIG. 8 separated into two boxes 822 and 824. In some embodiments, the blocks 802, 804, 812, 814, and 816 included in the box 822 may be performed by a provider server such as the provider server 110 or the DR server 210. Additionally, in some embodiments, the blocks 806, 808, 810, 818, and 820 included in box 824 may be performed by a customer device such as the customer device 104 or DR customer device 204.

The method 800 may begin at block 802. At block 802, a mapping may be generated. In some embodiments, the mapping may be generated by provider server in response to an enrollment message received from a customer device. The mapping may include an OTP encrypted using a device ID of the customer device. The device ID may be included in the received enrollment message.

At block 804, a QR code may be generated. In some embodiments, the QR code may be generated by the provider server. The QR code may include a URL, a provider CRT, the OTP encrypted using the device ID, and CSR content.

At block 806, a read image of the QR code may be received. In some embodiments, the QR code may be received by the customer device. At block 808, the OTP using the device ID may be decrypted. In some embodiments, the OTP may be decrypted by the customer device.

At block 810, a confirmation message may be transmitted to the URL. In some embodiments, the confirmation message may be transmitted by the customer device. The confirmation message may include a generated public key, a CSR, and a decrypted OTP to the URL. At block 812, the confirmation message may be received. In some embodiments, the confirmation message may be received by the provider server. The confirmation may be received at a website identified by the URL. At block 814, the decrypted OTP may be verified against the mapping. In some embodiments, the decrypted OTP may be verified by the provider server.

At block 816, settings may be communicated. In some embodiments, the settings may be communicated by the provider server. The settings may include information used to configure the customer device or a gateway device for secure communication with the provider server;

At block 818, the settings may be received. In some embodiments, the customer device may receive the settings. At block 820, information may be securely communicated. Block 820 is included in both of the boxes 822 and 824. The information may be securely communicated by the provider server and/or the customer device. The information may be securely communicated using the one or more application configuration settings, a provider public key, a provider private key, the generated public key, and a generated private key.

Additionally or alternatively, the method 800 may include querying a DR gateway device for a gateway device public key and for a gateway device CSR. The DR gateway device may be configured to communicate information related to energy usage of at least one appliance of a residential site or a SMB site. The method 800 may further include receiving the gateway device public key and the gateway device CSR from the DR gateway device and forwarding the gateway device public key and the gateway device CSR to the provider server. A gateway device CRT may then be received from the provider server and the settings and the gateway device CRT may be forwarded to the DR gateway device. In these and other embodiments, the securely communicating information includes securely communicating of the information related to energy usage of at least one appliance with the DR gateway device.

Additionally or alternatively, the method 800 may include communicating the enrollment message via an OOB network and generating a customer device public key, a customer device private key, and a customer device CSR. The method 800 may also include applying the settings. In these and other embodiments, the settings may configure a DR application for communication of information related to energy usage of a residential site or a SMB site. In these and other embodiments, the securely communicating information may include securely communicating the information related to energy usage with the customer device.

Additionally or alternatively, the method 800 may include communicating the customer device CSR to a CA and then receiving a signed customer device CSR and a customer device CRT from the CA. The customer device CRT may then be communicated the customer device. In these and other embodiments, the customer device may include a DR customer device that further includes a DR application that may be configured to communicate information related to energy use of a residential site or a SMB. Additionally, the CSR may include a customer device CSR of the DR customer device.

The embodiments described herein may include the use of a special-purpose or general-purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general-purpose or special-purpose computer. By way of example, and not limitation, such computer-readable media may include tangible or non-transitory computer-readable storage media including RAM, ROM, EEPROM, CD-ROM or other optical disk storage, magnetic disk storage or other magnetic storage devices, or any other non-transitory storage medium which may be used to carry or store desired program code in the form of computer-executable instructions or data structures and which may be accessed by a general-purpose or special-purpose computer. Combinations of the above may also be included within the scope of computer-readable media.

Computer-executable instructions comprise, for example, instructions and data, which cause a general-purpose computer, special-purpose computer, or special-purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" may refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modules running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present invention have been described in detail, it should be understood that the various changes, substitutions, and alterations could be made hereto without departing from the spirit and scope of the invention.

What is claimed is:

1. A method comprising:

in response to an enrollment message received at a provider server, generating, by the provider server, a mapping, the enrollment message being received from a customer device and including a device identification number (device ID) of the customer device, the mapping including a one-time password (OTP) that is encrypted using the device ID;

generating, by the provider server, a quick response (QR) code, the QR code including a uniform resource locator (URL), a provider certificate (CRT), the OTP encrypted using the device ID, and certificate signing request (CSR) content;

receiving, from the customer device, a confirmation message at a website that is identified by the URL, the confirmation message including a generated public key, a CSR, and a decrypted OTP;

verifying, by the provider server, the decrypted OTP against the mapping;

communicating, by the provider server, one or more application configuration settings; and securely communicating information, by the provider server, using the one or more application configuration settings, a provider public key, a provider private key, the generated public key, and a generated private key.

2. The method of claim 1, wherein:
the customer device includes a demand response (DR) customer device including a DR application configured to communicate information related to energy use of a residential site or a small and medium-sized business (SMB) site,
the CSR includes a customer device CSR of the DR customer device, and
the provider server includes a DR server,
the method further comprising:
   communicating the customer device CSR to a certificate authority (CA);
   receiving a signed customer device CSR and a customer device CRT from the CA; and
   communicating the customer device CRT to the DR customer device.

3. The method of claim 2, wherein the one or more application configuration settings and the customer device CRT are encrypted.

4. The method of claim 1, wherein:
the generated public key includes a gateway device public key generated with a gateway device private key; and
the securely communicating information includes securely communicating information with a demand response (DR) gateway device that is configured to communicate information related to energy use of at least one appliance in a residential site or a small and medium-sized business (SMB) site.

5. The method of claim 1, wherein:
the generated public key includes a customer device public key that is generated with a customer device private key; and
the securely communicating information includes securely communicating information with a demand response (DR) customer device that includes a DR application configured to communicate information related to energy use of a residential site or small and medium-sized business (SMB) site.

6. The method of claim 1, wherein the confirmation message is communicated according to a transport layer security (TLS) cryptographic protocol.

7. The method of claim 1, wherein the OTP is rate-limited.

8. A non-transitory computer-readable medium having encoded therein programming code executable by one or more processors to perform operations, the operations comprising:
in response to an enrollment message received at a provider server, generating, by the provider server, a mapping, the enrollment message being received from a customer device and including a device identification number (device ID) of the customer device, the mapping including a one-time password (OTP) encrypted using the device ID;
generating, by the provider server, a quick response (QR) code, the QR code including a uniform resource locator (URL), a provider certificate (CRT), the OTP encrypted using the device ID, and certificate signing request (CSR) content;

receiving, from the customer device, a confirmation message at a website that is identified by the URL, the confirmation message including a generated public key, a CSR, and a decrypted OTP;

verifying, by the provider server, the decrypted OTP against the mapping;

communicating, by the provider server, one or more application configuration settings; and securely communicating information, by the provider server, using the one or more application configuration settings, a provider public key, a provider private key, the generated public key, and a generated private key.

9. The non-transitory computer-readable medium of claim 8, wherein:
the customer device includes a demand response (DR) customer device including a DR application configured to communicate information related to energy use of a residential site or a small and medium-sized business (SMB) site,
the CSR includes a customer device CSR of the DR customer device,
the provider server includes a DR server, and
the operations further comprise:
   communicating the customer device CSR to a certificate authority (CA);
   receiving a signed customer device CSR and a customer device CRT from the CA; and
   communicating the customer device CRT to the DR customer device.

10. The non-transitory computer-readable medium of claim 9, wherein the one or more application configuration settings and the customer device CRT are encrypted.

11. The non-transitory computer-readable medium of claim 8, wherein:
the generated public key includes a gateway device public key generated with a gateway device private key; and
the securely communicating information includes securely communicating information with a demand response (DR) gateway device that is configured to communicate information related to energy use of at least one appliance in a residential site or a small and medium-sized business (SMB) site.

12. The non-transitory computer-readable medium of claim 8, wherein:
the generated public key includes a customer device public key that is generated with a customer device private key; and
the securely communicating information includes securely communicating information with a demand response (DR) customer device that includes a DR application configured to communicate information related to energy use of a residential site or small and medium-sized business (SMB) site.

13. A method comprising:
receiving, at a customer device, a read image of a quick response (QR) code, the QR code including a one-time password (OTP) encrypted using a device identification number (device ID), a uniform resource locator (URL), a provider certificate (CRT), and certificate signing request (CSR) content;
decrypting, by the customer device, the OTP using the device ID;
transmitting, to a provider server by the customer device, a confirmation message to the URL included in the QR code, the confirmation message including a generated public key, a CSR, and a decrypted OTP; and receiving, from the provider server, one or more application configuration settings, the application configuration settings including information used to configure a customer device or a gateway device for secure communication with a provider server.

14. The method of claim 13, further comprising:
communicating, to the provider server, an enrollment message including the device ID via an out of band (OOB) network;
generating, by the customer device, a customer device public key, a customer device private key, and a customer device CSR;
applying the one or more application configuration settings, wherein the application configuration settings configure a demand response (DR) application for communication of information related to energy usage of a residential site or a small and medium-sized business (SMB) site; and
securely communicating information, with the provider server, using the one or more application configuration settings, a provider public key, a provider private key, the generated customer device public key, and the generated customer device private key.

15. The method of claim 14, further comprising:
communicating, by the customer device, the customer device CSR to a certificate authority (CA); and
receiving a signed customer device CSR and a customer device CRT from the CA.

16. The method of claim 13, wherein the one or more application configuration settings are encrypted, and the method further comprises decrypting, by the customer device, the one or more application configuration settings.

17. The method of claim 13, further comprising:
querying, by the customer device, a demand response (DR) gateway device for a gateway device public key and for a gateway device CSR, wherein the gateway device CSR is generated at the DR gateway device, and wherein the DR gateway device is configured to communicate of information related to energy usage of at least one appliance of a residential site or a small and medium-sized (SMB) site;
receiving, at the customer device, the gateway device public key and the gateway device CSR;
forwarding, by the customer device, the gateway device public key and the gateway device CSR to the provider server;
receiving, by the customer device, a gateway device CRT from the provider server; and
forwarding, by the customer device, the one or more application configuration settings and the gateway device CRT to the DR gateway device.

18. The method of claim 13, wherein the confirmation message is communicated according to a transport layer security (TLS) cryptographic protocol.

19. A method comprising:
in response to an enrollment message received from a customer device at a provider server, generating, by the provider server, a mapping including a one-time password (OTP) encrypted using a device identification number (device ID) of the customer device that is included in a received enrollment message;
generating, by the provider server, a quick response (QR) code, the QR code including a uniform resource locator (URL), a provider certificate (CRT), the OTP encrypted using the device ID, and certificate signing request (CSR) content;
receiving, by the customer device, a read image of the QR code;
decrypting, by the customer device, the OTP using the device ID;
transmitting, by the customer device, a confirmation message including a generated public key, a CSR, and a decrypted OTP to the URL included in the QR code;
receiving, by the provider server, the confirmation message at a website identified by the URL;
verifying, by the provider server, the decrypted OTP against the mapping;
communicating, by the provider server, one or more application configuration settings, the application configuration settings including information used to configure the customer device or a gateway device for secure communication with the provider server;
receiving, by the customer device, the one or more application configuration settings; and
securely communicating information between the provider server and the customer device or the gateway device using the one or more application configuration settings, a provider public key, a provider private key, the generated public key, and a generated private key.

20. The method of claim 19, further comprising:
querying, by the customer device, a demand response (DR) gateway device for a gateway device public key and for a gateway device CSR, wherein the DR gateway device is configured to communicate information related to energy usage of at least one appliance of a residential site or a small and medium-sized (SMB) site;
receiving, by the customer device, the gateway device public key and the gateway device CSR from the DR gateway device;
forwarding, by the customer device, the gateway device public key and the gateway device CSR to the provider server;
receiving, by the customer device, a gateway device CRT from the provider server; and
forwarding, by the customer device, the one or more application configuration settings and the gateway device CRT to the DR gateway device,
wherein the securely communicating information includes securely communicating of the information related to energy usage of at least one appliance with the DR gateway device.

21. The method of claim 19, further comprising:
communicating, by the customer device, the enrollment message via an out of band (OOB) network;
generating, by the customer device, a customer device public key, a customer device private key, and a customer device CSR; and
applying, by the customer device, the one or more application configuration settings, wherein the one or more application configuration settings configure a demand response (DR) application for communication of information related to energy usage of a residential site or a small and medium-sized business (SMB) site,
wherein the securely communicating information includes securely communicating the information related to energy usage with the customer device.

22. The method of claim 19, wherein the customer device includes a demand response (DR) customer device including a DR application configured to communicate information related to energy use of a residential site or a small and medium-sized business (SMB) site, and wherein the CSR includes a customer device CSR of the DR customer device, the method further comprising:

communicating, by the provider server, the customer device CSR to a certificate authority (CA);

receiving, by the provider server, a signed customer device CSR and a customer device CRT from the CA; and communicating, by the provider server, the customer device CRT to the DR customer device.

* * * * *